United States Patent [19]

Moritsugu et al.

[11] Patent Number: 5,347,505
[45] Date of Patent: Sep. 13, 1994

[54] OPTICAL MEDIUM RECORDING METHOD AND APPARATUS EMPLOYING PULSE WIDTH DELAY AND/OR ADVANCEMENT

[75] Inventors: Masaharu Moritsugu; Haruhiko Izumi; Masakazu Taguchi, all of Kawasaki, Japan

[73] Assignee: Fujitsu Limited, Kawasaki, Japan

[21] Appl. No.: 4,865

[22] Filed: Jan. 19, 1993

[30] Foreign Application Priority Data

Jan. 20, 1992 [JP] Japan .................................. 4-007780
Mar. 19, 1992 [JP] Japan .................................. 4-064046
Oct. 9, 1992 [JP] Japan .................................. 4-271592

[51] Int. Cl.$^5$ ............................................. H04N 5/76
[52] U.S. Cl. ........................................ 369/59; 369/60
[58] Field of Search ............... 369/54, 58, 59, 60, 369/116, 124

[56] References Cited

U.S. PATENT DOCUMENTS 5,043,971  8/1991  Van et al. ............................. 369/124
5,128,921  7/1992  Van et al. ............................. 369/124

FOREIGN PATENT DOCUMENTS 0392853  10/1990  European Pat. Off. .
63-53722   3/1988  Japan .
4-137224   5/1992  Japan .

OTHER PUBLICATIONS

Patent Abstracts of Japan, unexamined application, P field, vol. 12, No. 271, Jul. 28, 1988.
Patent Abstracts of Japan, unexamined application, P field, vol. 13, No. 102, Mar. 10, 1989.

*Primary Examiner*—Donald Hajec
*Assistant Examiner*—Thomas N. Forbus, Jr.
*Attorney, Agent, or Firm*—Nikaido, Marmelstein, Murray & Oram

[57] ABSTRACT

A method and apparatus for optical recording addresses a problem of edge shift which occurs during the recording. The apparatus includes a rotating mechanism for rotating an optical medium, and an optical head having a light source for recording information on the optical medium. A moving mechanism moves the optical head to a predetermined position on the optical medium, and a recording controlling device controls light source of the optical head in accordance with a recording pulse. The recording controlling device includes a pulse width measuring device for measuring the pulse width of a recording pulse, and fall controlling device effects a recording compensation by advancing a fall of the recording pulse with a lead, such that the lead increases with the measured pulse width. A pulse interval measuring device is provided for measuring a pulse interval preceding the recording pulse, and a rise controlling device effects a recording compensation by delaying a rise of the recording pulse with a delay, such that the delay decreases with the measured pulse interval.

23 Claims, 32 Drawing Sheets

FIG. 8(A) RECORDED DATA
FIG. 8(B) RECORDING PULSE

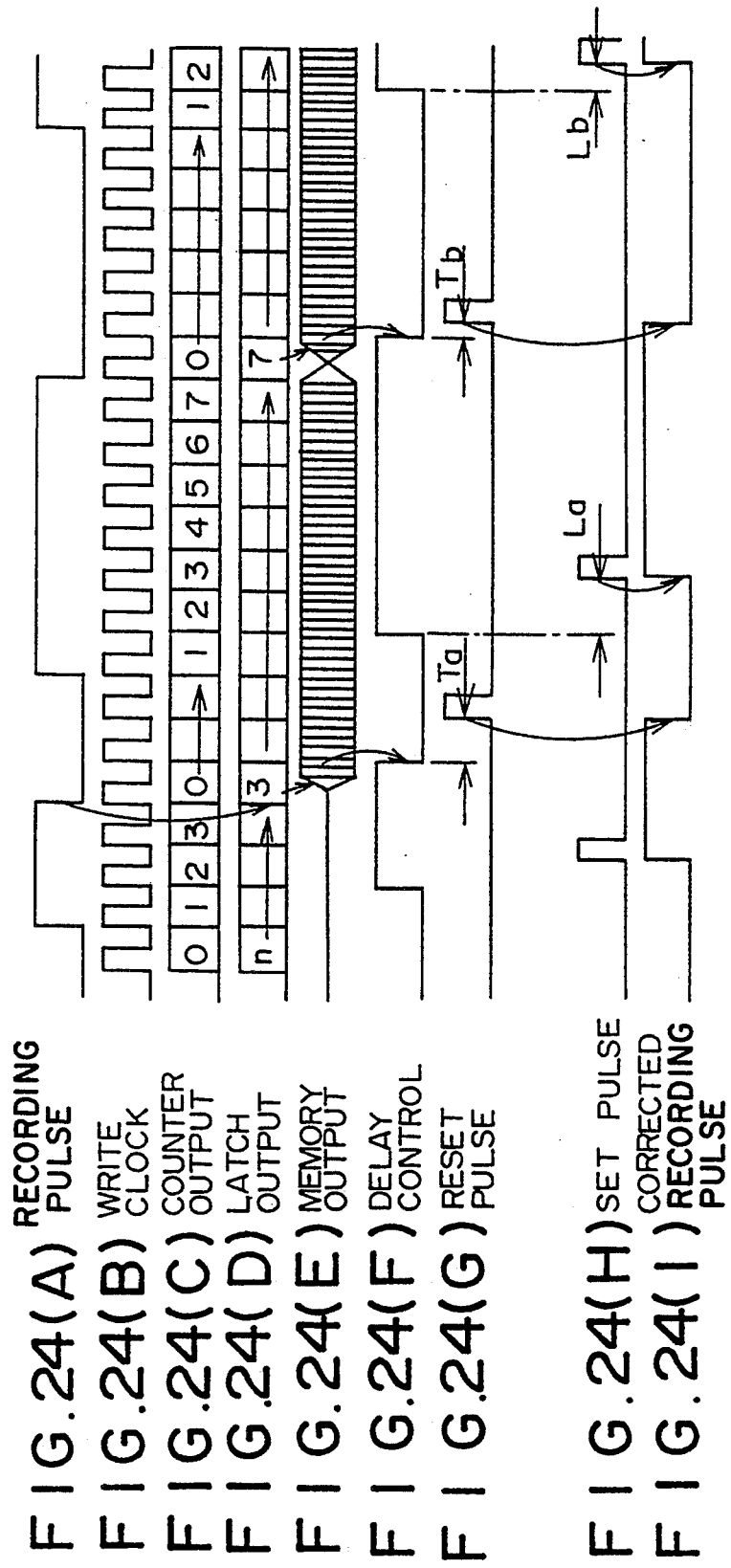

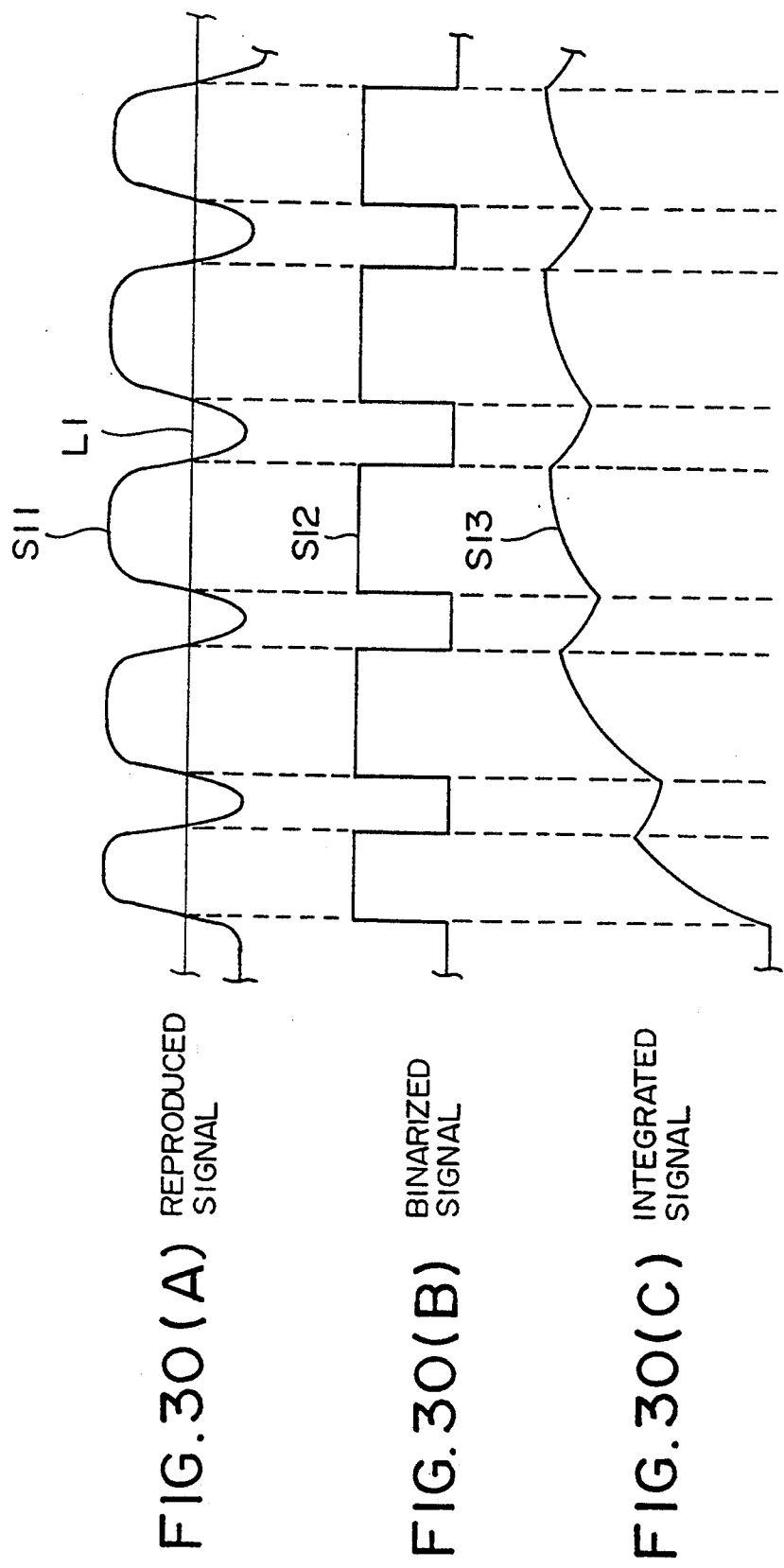

FIG. 31(A)
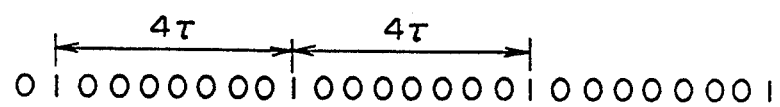
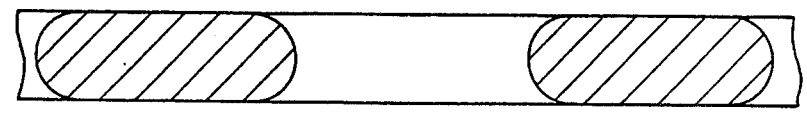
FIG. 31(B)
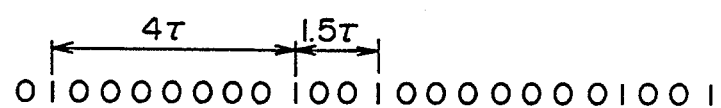
FIG. 31(C)

OPTICAL MEDIUM RECORDING METHOD AND APPARATUS EMPLOYING PULSE WIDTH DELAY AND/OR ADVANCEMENT

BACKGROUND ART

The present invention relates to an optical medium recording apparatus and an optical medium recording method, and more particularly to an apparatus and a method in which an information signal is recorded on an optical medium using a mark length recording method.

An optical disk apparatus, in which an optical disk is used as an optical medium because of its large storage capacity and medium interchangeability, is used in a filing system for storing image data or as an external storage device of a computer capable of code data recording/reproducing, The optical disk is being used in rapidly increasing number of different fields nowadays as a medium of supplying software or as a back-up device because it is mass-reproducible from a master disk, such as a compact disk.

Variations of such an optical disk used in recording/reproducing in an optical disk apparatus area: a read-only medium, a typical example of which is a CD-ROM; a write-once medium capable of recording only once and used mainly in a filing apparatus handling image information; and a rewritable medium capable of handling coded information and of recording and erasing information as many times as desired.

As an example of the rewritable medium above, a 5-inch magneto-optic disk, whose medium format is standardized by ISO, an international standardizing organization, is already available as a commercial product. After the 5-inch medium format was standardized, the 3.5-inch medium format was standardized by ISO, and several types of 3.5-inch optical disks are already available as a product.

In order for the 5-inch and 3.5-inch optical disks to become widely used in the future, it is essential that such disks have an even greater performance ability and larger storage capacity, as well being less expensive. In this respect, a recording method and a recording apparatus, capable of recording desired information accurately utilizing a high-density recording method, is necessary.

FIG. 1 illustrates the configuration of an example of an optical head in the conventional optical disk apparatus. In an optical head 11 of FIG. 1, a light beam emitted from a semiconductor laser 12 provided as a light source is turned into parallel light by a collimating lens 13, allowed to pass through a first beam splitter 14, reflected by a reflecting mirror 15, and caused to be incident on an objective lens 16.

The objective lens 16 converges the incident light beam and forms, by focusing the beam, a light spot on the medium surface of an optical disk 17 that rotates on a spindle, which is a rotating mechanism. The objective lens 16 itself is positionally controlled by means of a signal obtained by allowing an output control signal from an amplifier 22 described later to undergo signal processing, so that a minute spot narrowed to a diffraction limit is impinged accurately on a specified track while keeping track of radial runout and axial deflection of the magneto-optic disk 17. The optical head 11 is moved in a radial direction of the magneto-optic disk 17 by a moving mechanism 10.

When recording or erasing information on a medium, only the part thereof where a laser spot is impinged undergoes temperature rise beyond the Curie temperature, due to the irradiating laser power being magnified; and an external magnetic field applied by a bias coil 18 to the magneto-optic disk 17 causes the medium to be magnetized in the same direction as the externally applied magnetic field.

When reproducing information, signals on the recording medium are detected by utilizing a reflection of light from the magneto-optic disk 17. Light reflected by the magneto-optic disk 17 and converged by the objective lens 16 is allowed to travel on the same optical path that it travels on when it is incident on the disk, is then reflected by the first beam splitter 14 that the light passed through on its way to the disk, and caused to digress from the incident light path. The reflected laser light separated off by the first beam splitter 14 is split into a transmitted light and a reflected light by a second beam splitter 19. The reflected light is applied to a photodetector 21 and the amplifier 22 so as to generate an error signal for focus control and track control needed for the objective lens 16 to maintain accurate tracking.

The transmitted light from the second beam splitter 19 is split by a polarizing beam splitter 24 after passing through a wavelength plate 23, the split light beams being caused to be incident on photodetectors 27, 28 via converging lenses 25, 26, respectively. The output electric signals from the photodetectors 27, 28 are fed to the inputs of a differential amplifier 29 and an additional amplifier 30, respectively. The differential amplifier 29 generates a magneto-optic signal (MO signal); and the additional amplifier 30 generates an ID signal. The ID signal is a signal recorded as heights and depressions on a track, and includes a track number and a sector number. This ID signal is detected as a change in light amount accompanying diffraction of light by the heights and depressions on the recording medium. The magneto-optic signal is detected as a change in light polarization which depends upon the direction of magnetization.

FIG. 2 illustrates the construction of the magneto-optic disk medium. The magneto-optic disk 17 is constructed such that a recording layer 32 is formed on a substrate 31, and pre-grooves 33, used as grooves for guiding the light Spot so that it hits a specified track, are formed on the entire radial extent at a track pitch of 1.6 $\mu$m. The depth of these pre-grooves 33 is preset to be about ¼ of a wavelength $\lambda$ of a light beam so that the sensitivity of a track error signal is at a maximum.

Land portions 34 are formed between the adjacent pre-grooves 33. A minute spot obtained by converging the beam by means of the objective lens is impinged on this land portion 34. Pits or marks for the ID signal containing the track number and sector number are built in the form indicated by a numeral 35 in FIG. 2, the marks or pits being provided, in the form of heights and depressions, on the disk at the time of fabrication thereof. The depth of this recorded pit 35 for an ID signal is preset to be $\lambda/4$ or in the neighborhood thereof so that the pre-grooves 33 may not affect the track error signal.

Recorded information (user data) is recorded in the form indicated by a numeral 36 by means of a light beam incident on the recording layer 32 on the land portion 34 that borders on the recorded pit 35 for the ID signal, not as heights and depressions but as direction of magnetization of a magnetic film, the recording being done by using a mark length recording method (described later). Both in recording and reproducing, the light beam is incident from behind the substrate 31 and converged so as to be focused on the recording layer 32.

FIG. 3 shows how the magneto-optic signal is detected; and FIG. 4 shows a vector diagram of the components of the light reflected by the magneto-optic disk. As shown in FIG. 3, the plane of polarization of the light reflected by the magneto-optic disk 17 after the light is incident thereon is such that a reflected light A reflected from a part of the disk which is magnetized top to bottom rotates, due to the magnetic Kerr effect, in a positive direction, whereas the reflected light B reflected from a part of the disk which is magnetized bottom to top rotates in a negative direction, each rotation equaling $\theta_k$ degrees. $\theta_k$ denotes the Kerr rotation angle which has an extremely small value of about 1°.

The reflected lights A and B have an S polarized component and a P polarized component and, as shown in FIG. 4, may be represented by mutually different vectors. Therefore, in a readout system, the reflected lights are split with respect to the plane of polarization, i.e., are split into a P-polarized component parallel to the plane of incidence on the polarizing beam splitter 24 and an S-polarized component perpendicular thereto. Detection of the Kerr rotation angle $\theta_k$ is possible because the polarizing beam splitter 24 lets the P-polarized component pass through it and reflects the S-polarized component.

Since a 45° offset is applied to the detected P-polarized component, by means of the wavelength plate 23, the detected P-polarized component is given by $$P = K\{\cos^2(45 - \theta_k) - \cos(45 + \theta_k)\} \quad (1)$$
$$= K \cdot \sin(2\theta_k)$$

A description will now be given of how information is recorded on the magneto-optic disk 17. In an initial state, magnetization on the magneto-optic disk 17 is unidirectional, i.e., the disk is magnetized in a "erase" direction. In order to write a recorded data consisting of "0's" and "1's" arranged in a selected order on the disk, the disk is heated until the Curie point is reached (in the case of the magneto-optic disk, this means the Curie temperature, which is on the order of 100°-200°; and, in the case of a phase transition disk, this means a phase transition temperature on the order of several hundred degrees) by means of a recording laser beam that is turned on and off in accordance with the recorded data. An external magnetic field is then applied to the heated portion of the disk, so that a series of marks, each having a generally elliptical shape, is formed, the magnetization direction of the masks being opposite to the "erase" direction.

Conventional methods of recording information on the magneto-optic disk include a mark position recording method (also known as a mark interval recording method), which is used in a rewritable optical disk, and a mark edge recording method (also known as a mark length recording method), which is used in a compact disk. Descriptions will now be given of the mark interval recording method and the mark length recording method with reference to FIG. 5.

Supposing that a recorded data sequence "0100100000001000" shown in FIG. 5(A) (the encoding of which data sequence is done in accordance with a (2,7) RLL (run length limited) formation suitable for recording information on the magneto-optic disk) is input when the mark interval recording method is implemented, recording marks (domains) $P_1$, $P_2$ and $P_3$ are recorded on the disk positions corresponding to the data "1", as indicated by a shaded portion of FIG. 5(B), while no recording marks are recorded on disk positions corresponding to the data "0". That is, the mark interval recording method is a method in which the presence and absence of the recording marks is made to correspond to the recorded data "1" and "0" respectively. When data is retrieved from the optical disk in which the information is recorded in accordance with the mark interval recording method, data detection is effected by detecting the peak points in the reproduced waveform shown in FIG. 5(C).

In the mark length recording method, the edges of recording marks (domains) $P_{10}$ and $P_{11}$ are located on the disk positions corresponding to the data "1", as indicated by a shaded portion of FIG. 5(D), by reversing, at every position corresponding to the "1" bit in the above input data sequence, the recording light intensity.

When data is retrieved from the optical disk in which the information is recorded in accordance with the mark length recording method, data detection is made possible by binarizing the reproduced waveform shown in FIG. 5(E) with reference to a reference level (slice level). As can be seen in FIG. 5, the mark length recording enables higher recording density than does the mark interval recording. Given that the minimum mark length is the same, the mark length recording can achieve a recording density twice that of the mark interval recording.

Accordingly, it is found that the mark length recording method, in which the recorded data value "1" is made to correspond to the edge of the recording marks, is suitable for the purpose of improving the recording density of the optical disk. It is important, in the mark length recording method, to detect, at the time of reproduction, the position where the edge of the recording marks is recorded. Because the recording process of the optical disk is characterized as a heat mode recording, in which the laser light emitted from a semiconductor laser is used as a heat source in recording the recording marks, it becomes necessary to remove thermal shift and pattern shift that occur during the recording process.

FIG. 6 shows thermal shift; and FIG. 7 shows thermal shift characteristics. A case is considered here in which the recorded data sequence shown in FIG. 6(A) is converted, in accordance with the mark length recording method, into the recorded pulse shown in FIG. 6(B), and the corresponding beam is impinged upon the optical disk, the high-level period of the recorded pulse being set to be substantially long, and the light intensity being set at a substantially high level. When the recording is effectuated such that the temperature at the position of impingement of the beam on the disk is raised so that reversal in magnetization direction therein occurs, the front edge of a mark $P_{22}$, which, of the two adjacent recording marks $P_{21}$ and $P_{22}$, is the one recorded later, is recorded in a position removed, toward the preceding mark $P_{21}$, by $P_t$ from where the front edge should otherwise have been recorded, due to thermal influence from the preceding mark $P_{21}$.

This is how thermal shift occurs, and the shorter the interval between the preceding mark and the mark about to be recorded, in other words, the shorter the pulse interval (the low-level period of FIG. 6(B)) of the recording pulse, the greater the thermal shift amount $\Delta P_t$, as shown in FIG. 6(D).

FIG. 7 shows the mark front edge shift occurring when the marks are recorded using a laser light at four write power levels ranging from 5.5 mW to 8.5 mW. In the case of 6.5 mW write power indicated by □, it is found that the shorter the interval between the marks, in other words, as the interval (in μm) between the recording pulses for causing the LD to emit light becomes shorter starting from 2.5 μm, 2.0 μm till it is 1.0 μm, the greater the mark front edge shift amount (in μm) becomes. The same is true of the other write power levels.

FIG. 8 shows a pattern shift; and FIG. 9 shows pattern shift characteristic. A case is considered here in which the recorded data sequence shown in FIG. 8(A) is converted, in accordance with the mark length recording method, into the recording pulse shown in FIG. 8(B), the high-level period of the recording pulse being set to be substantially long, and the light intensity being set at a substantially high level, so that the heat mode recording like the one described above is effected and two adjacent marks $P_{31}$ and $P_{32}$ are formed on the optical disk, as shown in FIG. 8(C). Since the medium temperature is gradually raised when the marks $P_{31}$ and $P_{32}$ are being recorded, the positions at which the back ends of the marks $P_{31}$ and $P_{32}$ are recorded are shifted, further down the track, $\Delta P_c$, $\Delta P_c + \Delta P_p$, respectively from positions where the marks should otherwise have been recorded.

This is how the aforementioned pattern shift occurs, and the longer the recording marks, in other words, the longer the pulse width (the high-level period of FIG. 8(B)) of the recording pulse, the greater the amount of pattern shift $\Delta P_p$, as shown in FIG. 8(D).

FIG. 9 shows back edge shift occurring when the marks are recorded using a laser light at four write power levels, namely 5.5 mW, 6.5 mW, 7.5 mW and 8.5 mW.

In the case of 6.5 mW write power indicated by □, it is found that the longer the mark, in other words, as the duration (in μm) of the pulse for causing the LD to emit light becomes longer starting from 1.0 μm, 1.5 μm till it is 2.5 μm, the greater the amount of back edge shift (in μm). The same thing is true of the other write power levels.

The above-mentioned $\Delta P$ is a difference between: the length of the recording mark $P_{31}$ manifested when the maximum pulse interval is followed by the pulse having the minimum pulse width; and the length of the same mark unaffected by pattern shift. $\Delta P_c$ is referred to as constant shift. This constant shift is characterized as a phenomenon in which the edge position varies in accordance with the variation of write power of the laser light. The variation of write power may be regarded as being equivalent to the variation of ambient temperature or the variation of sensitivity of the magneto-optic disk acting as a medium.

In order to successfully implement the mark length recording method, it is essential to remove, in a recording process, thermal shift $\Delta P_t$ and pattern shift $\Delta P_p$, from among the above-mentioned three kinds of shift, i.e., thermal shift $\Delta P_t$, pattern shift $\Delta P_p$ and constant shift $\Delta P_c$. This is because, while constant shift $\Delta P_c$ is a component subject to variation due to medium sensitivity or ambient temperature and may be compensated for, because of a prevalent low-frequency component, in a signal processing system, the other two kinds of shift $\Delta P_t$ and $\Delta P_p$ may be expected to contain much the same frequency component as the recording signal, and are difficult to eliminate at the time of reproduction. Accordingly, the above edge shifts are dealt with by affecting recording compensation such that the timing at which the LD is turned on and off is varied in accordance with the recorded data pattern so that the accurate reproduction may be achieved. Specifically, it was reported by the Institute of Electronics, Information and Communication Engineers that compensation for the timing of turning the LD on is required to eliminate thermal shift; and compensation for the timing of turning the LD off is required to eliminate pattern shift.

It is proposed that the variation of medium sensitivity be dealt with by performing trial recordings for a plurality of test regions along the radius of the disk, wherein the write power level used at the time of erasing, recording and reproducing is varied as a parameter, and that a combination of write power levels causing the fewest errors when the data is being reproduced be used thereafter in performing recording and reproducing.

Conventional proposals for executing recording compensation with respect to edge shift include the methods as described in the Japanese Laid-Open Patent Publication No. 63-53722, No. 63-281229 and No. 62-12463, in which the densest data pattern or a predetermined data pattern is detected so that the recording pulse width is controlled at the time of recording.

These methods described in the Japanese Laid-open Patent Publications are based on the controlling of the pulse width in accordance with the data pattern. A simplified description of these methods will be given by describing an example of the Japanese Laid-Open Patent Publication No. 63-53722, with reference to the circuit diagrams of FIG. 10 and 11.

In FIG. 10, a D flip-flop 41 forms a mark edge recording data pattern (NRZ code) on the basis of a given code, and a delay is applied to the NRZ code by means of a delay element 42. Meanwhile, a correction amount is determined by a recording corrector 43 on the basis of control information; and, on the basis of this amount, a delay amount applied by the delay element 42 is selected by a selector 44. Specifically, a signal from one of a plurality of output taps of the delay element 42 is selected. An AND gate 45 generates a data pulse for which the pulse width is corrected on the basis of a delayed data pulse and a non-delayed data pulse. The generated data pulse drives a semiconductor laser driving system 46. Further, laser power is controlled such that a correction amount is transmitted from the recording corrector 43 to a D/A converter 48 of a power setting unit 47 so that the driving of the semiconductor laser is controlled in accordance with the data pattern.

FIG. 11 is a diagram of a circuit for generating control information of FIG. 10. In FIG. 11, a counter 49, an AND gate 50 and a D flip-flop 51 detect a pulse (HIGH PW-P) having a predetermined pattern, on the basis of a data pulse (DATA-P) and a clock pulse (CK-P), so that a power control signal is introduced in the circuit. Further pattern detection is executed by a counter 52, which is fed an output signal from the D flip-flop 51, and an AND gate 53. A delayed data pulse (DELAY DATA-P) is created by delaying the data pulse (DATA-P) by means of a shift register 54. The pulse (HIGHPW-P) and the delayed data pulse (DELAY DATA -P) are sent to the recording corrector 43 of FIG. 10 as the control information.

The present inventors would like to emphasize, with reference to FIGS. 7 and 9, the fact that pattern shift is determined solely by the recording mark length, and thermal shift is determined solely by the preceding pulse interval.

Accordingly, the method of detecting the pulse width and controlling laser power as used in the above-described apparatus functions such that the control amount at the rise and that at the fall of the recording pulse are the same. Such a method has a disadvantage in that edge shift is not completely corrected upon the introduction of only one control amount, because pattern shift and thermal shift are mutually independent and asymmetric, as described above.

As shown in FIG. 10 and 11, the method, in which the recording data pattern is detected and a amount delay amount is determined therefrom, has a disadvantage in that the circuit configuration becomes complex and the circuit becomes too large, and in that the timing for controlling becomes complicated, as the number of patterns to be detected increases. Moreover, the above method has a disadvantage in that implementing real-time control of a semiconductor laser power in accordance with the data pattern results in an increase of control parameters as well as an excessively complex circuit configuration.

The aforementioned method of performing trial recordings to deal with the variation of medium sensitivity from one medium to another has a disadvantage in that determination of a recording compensation amount with respect to edge shift characteristics is not taken into consideration in such trial recordings, in spite of the fact that not only the variation of medium sensitivity from one medium to another but also the variation of edge shift characteristics and compatibility with mediums having different edge shift characteristics need to be considered, and in that, consequently, proper recording is not executed.

SUMMARY OF THE INVENTION

An object of the present invention is to execute proper recording by compensating for edge shift readily and accurately.

In order to achieve this object, a first invention comprises an optical medium for recording information optically;

an optical head having a light source for recording information on the optical medium;

a moving mechanism for moving the optical head to a predetermined position on the optical medium;

recording controlling means for controlling the light source of the optical head in accordance with a recording pulse, the recording controlling means being configured such that it is provided with:

pulse width measuring means for measuring the pulse width of the recording pulse when the light source is driven by the recording pulse having its pulse width and pulse interval varied, marks are formed on the optical medium during a high-level period of the recording pulse and, thus, data are recording thereon;

fall controlling means for affecting recording compensation by advancing the fall of the recording pulse by a degree in proportion to the measured pulse width;

pulse interval measuring means for measuring pulse interval of the recording pulse; and rise controlling means for affecting recording compensation by delaying the rise of the next recording pulse in inverse proportion to the measured pulse interval.

Alternatively, the present invention comprises: an optical medium for recording information optically;

an optical head having a light source for recording information on the optical medium;

a moving mechanism for moving the optical head to a predetermined position on the optical medium; and recording controlling means for controlling the light source of the optical head in accordance with a recording pulse, the recording controlling means comprising:

difference pulse width measuring means for measuring a difference obtained by subtracting a preceding pulse interval from a pulse width of the recording pulse, when the light source is driven by the recording pulse having its pulse width and pulse interval varied, marks are formed on the optical medium during a high-level period of the recording pulse and, thus, data are recorded thereon;

fall controlling means for affecting recording compensation by advancing the fall of the recording pulse by a degree in proportion to the difference between the measured pulse width and the preceding pulse interval;

difference pulse interval measuring means for measuring a difference obtained by subtracting the preceding pulse width from the pulse interval of the recording pulse; and rise controlling means for effecting recording compensation by delaying the rise of the next recording pulse by a degree in inverse proportion to the difference between the measured pulse interval and the preceding pulse width.

It is thus ensured that the pattern shift amount is regular regardless of the recorded data pattern, by advancing the fall by a degree in proportion to the pulse width, and that thermal shift amount is constant regardless of the recorded data pattern by delaying the rise by a degree in inverse proportion to the pulse interval.

It is also ensured that the pattern shift amount is regular regardless of the extent to which the recording pulse width and the preceding pulse interval vary, by advancing the fall by a degree in proportion to the difference obtained by subtracting the preceding pulse interval from the pulse width, and that thermal shift amount is regular regardless of the extent to which the pulse interval and the preceding pulse width vary, by delaying the rise by a degree in inverse proportion to the difference obtained by subtracting the preceding pulse width from the pulse interval.

In addition to the configuration of the first invention, the second invention is provided with:

a first memory fed an address input of an output from the pulse width measuring means and outputting, to the fall controlling means, an edge shift correction amount data corresponding to the measured pulse width; and a second memory fed an address input of an output from the pulse interval measuring means and outputting, to the rise controlling means, an edge shift correction amount data corresponding to the measured pulse interval, the fall controlling means comprising:

a first delay circuit outputting, on the basis of the data output from the first memory, a first delay pulse having a delay time in inverse proportion to the measured pulse width; and a flip-flop which is fed the input of the first delay pulse through its set terminal and reset terminal, and outputs, from an output terminal, a corrected recording pulse for modulating light intensity of a light beam, and the rise controlling means being configured such that it is provided with:

a second delay circuit outputting, on the basis of the data output from the second memory, a second delay pulse having a delay time in inverse proportion to the measured pulse interval; and the flip-flop which is fed the input of the second delay pulse through its set terminal and reset terminal, and outputs, from the output terminal, a corrected recording pulse for modulating light intensity of the light beam.

It is thus ensured that the point of time (which is translated into the mark back edge) of the fall of the corrected recorded pulse output from the flip-flop is advanced with respect to the uncorrected recording pulse, the degree of advancing being in proportion to the pulse width of the recording pulse. This is possible because the flip-flop is reset by means of the first delay pulse having a delay amount in inverse proportion to the pulse width of the recording pulse, when implementing the mark length recording method effective for improving recording density of the optical disk.

It is also ensured that the point of time (which is translated into the mark front edge) of the rise of the corrected recording pulse output from the flip-flop is delayed with respect to the uncorrected recording pulse, the degree of delaying being in inverse proportion to the pulse interval of the recording pulse. This is possible because the flip-flop is reset by means of the second delay pulse having a delay amount in inverse proportion to the pulse interval of the recording pulse. Further, the present invention enables mutually independent control of the point of time of the rise/fall of the above-mentioned corrected recording pulse.

A third invention reinforces the first and second invention and is configured such that the fall controlling means comprises: binarizing means for effecting trial recordings in advance of the recording of the information, in such a manner that the mark recorded in correspondence to the recording pulse is made to correspond to the information, and for converting a reproduced signal derived from the mark into a binarized signal;

integrating means for integrating a binarized signal and outputting an integrated signal;

shift amount counting means for obtaining a pattern shift amount, a thermal shift amount and a constant shift amount on the basis of the integrated signal;

a first multiplying means for outputting an interpolation pattern shift data indicating the magnitude and direction of pattern shift, by multiplying the edge shift amount and a pattern shift interpolation function; and pattern shift compensation amount counting means for obtaining, on the basis of the interpolation pattern shift data, a compensation amount for cancelling the pattern shift, and outputting the obtained amount as a pattern shift compensation signal, and that the rise controlling means comprises binarizing means for effecting trial recordings in advance of the recording of the information, in such a manner that the mark recorded in correspondence to the recording pulse is made to correspond to the information, and for converting a reproduced signal derived from the mark into a binarized signal;

integrating means for integrating a binarized signal and outputting an integrated signal;

shift amount counting means for obtaining a pattern shift amount, a thermal shift amount and a constant shift amount on the basis of the integrated signal;

a second multiplying means for outputting a interpolation thermal shift data indicating the magnitude and direction of edge shift due to thermal shift, by multiplying the thermal shift amount and a thermal shift interpolation function; and thermal shift compensation amount counting means for obtaining, on the basis of the interpolation thermal shift data, a compensation amount for cancelling the thermal shift, and outputting the obtained amount as a thermal shift compensation signal.

It is thus ensured that the recording compensation amount with respect to three edge shift characteristics, namely, pattern shift, thermal shift and constant shift characteristics, can be determined from trial recordings, when implementing the edge recording/reproducing method so as to record marks on the optical medium. This makes it possible to deal with the variation of the edge shift characteristics from one medium to another, and realizes compatibility with mediums having different edge shift characteristics, so that appropriate mark recording is achieved.

BRIEF DESCRIPTION OF THE DRAWINGS

FIGS. 8(A) through 8(D) shows pattern shift;

FIGS. 24(A) through 24(I) are timing charts for explaining the operation in FIG. 23;

FIGS. 30(A) through 30(c) respectively show waveforms for the reproduced signal, the binarized signal and the integrated signal of FIG. 29;

FIGS. 31(A) through 31(C) show examples of trial recording pattern;

DESCRIPTION OF THE PREFERRED EMBODIMENT

Figure 1:
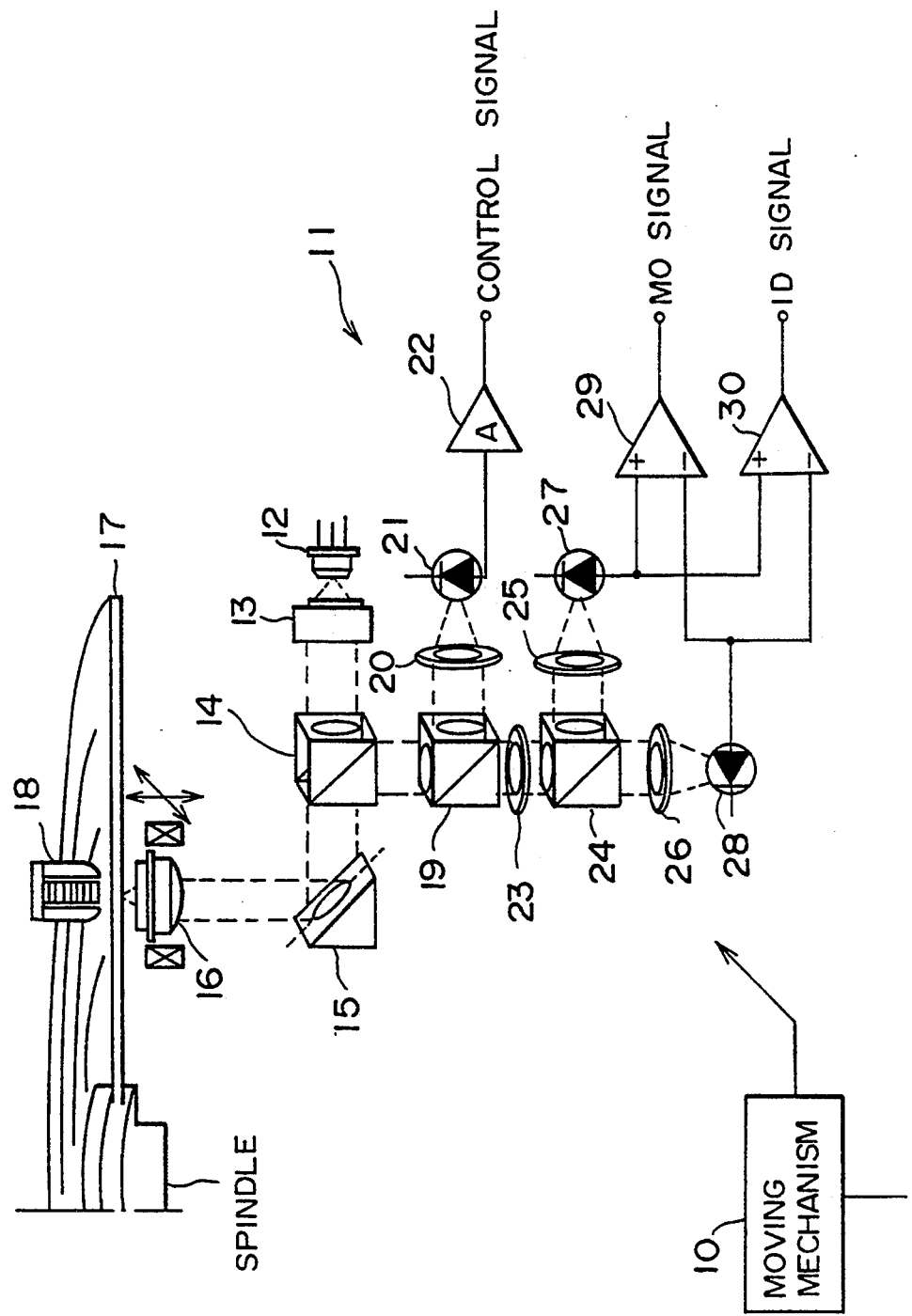
FIG. 1 illustrates the configuration of an example of an optical head in the conventional optical disk apparatus.
Figure 2:
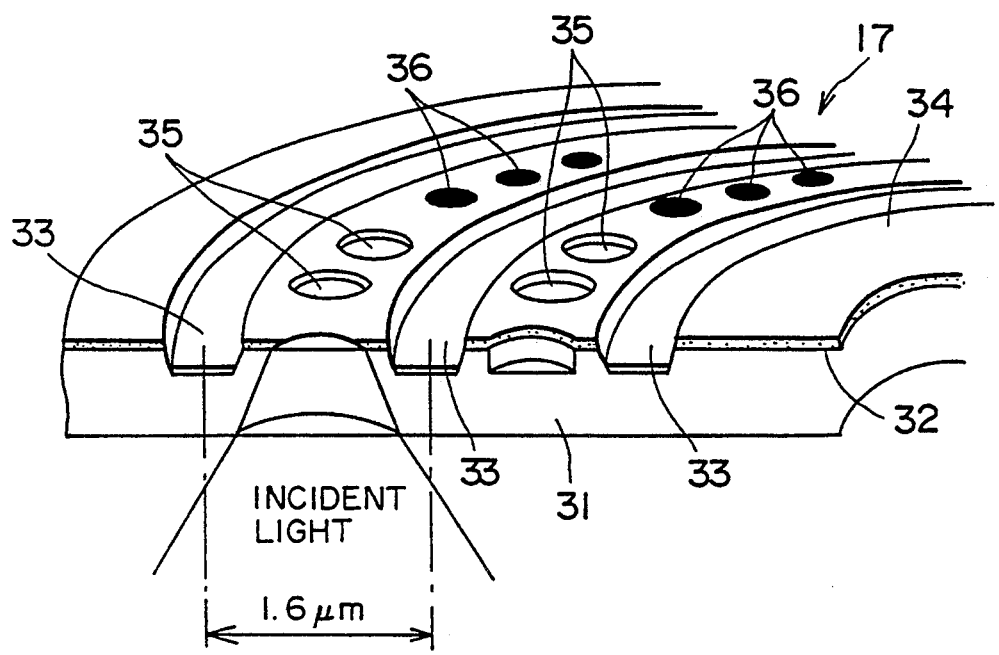
FIG. 2 illustrates the configuration of the magneto-optic disk medium.
Figure 3:
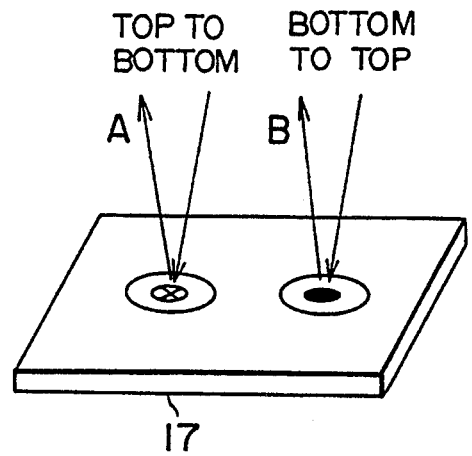
FIG. 3 shows how a magneto-optic signal is detected.
Figure 4:
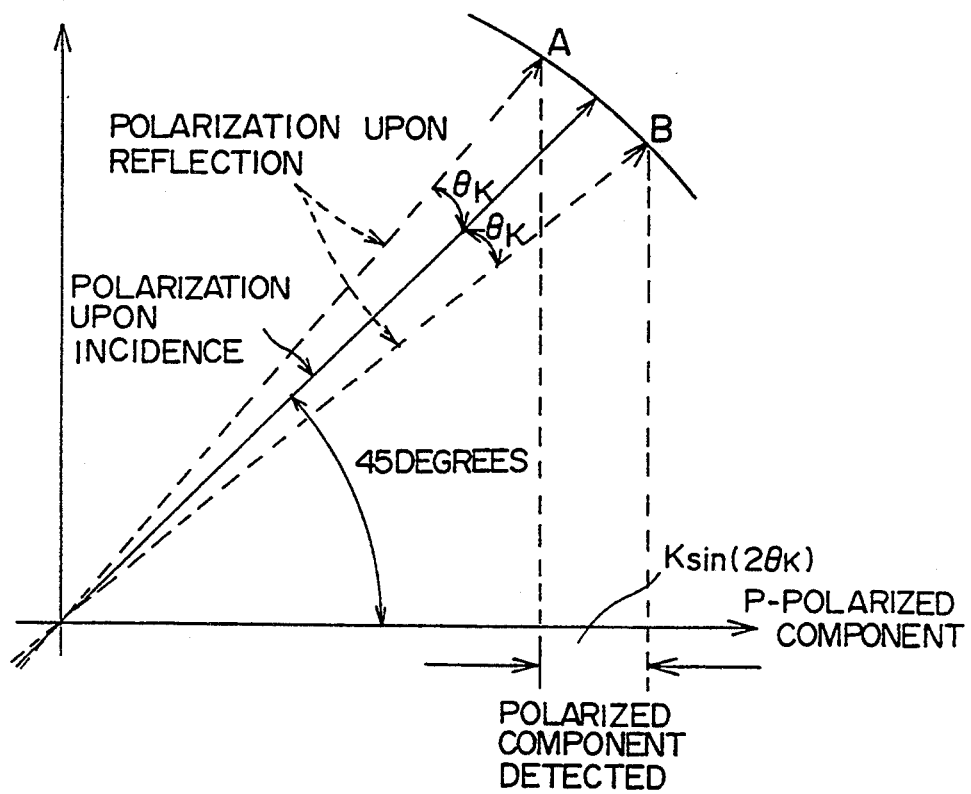
FIG. 4 is a vector diagram showing a component of light reflected by the magneto-optic disk.
Figure 5:
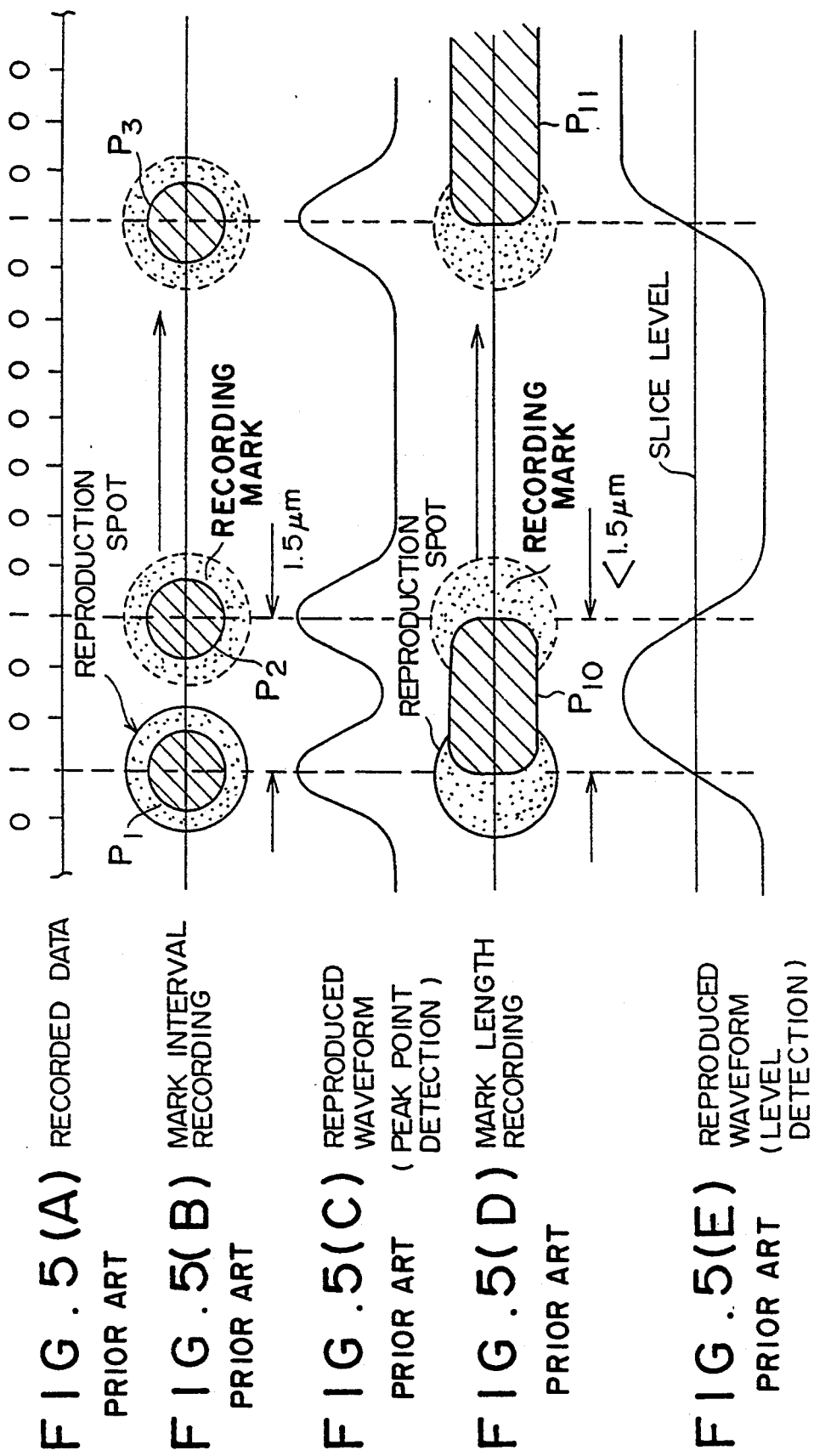
FIGS. 5(A) through 5(E) describe the mark interval recording method and the mark length recording method.
Figure 6:
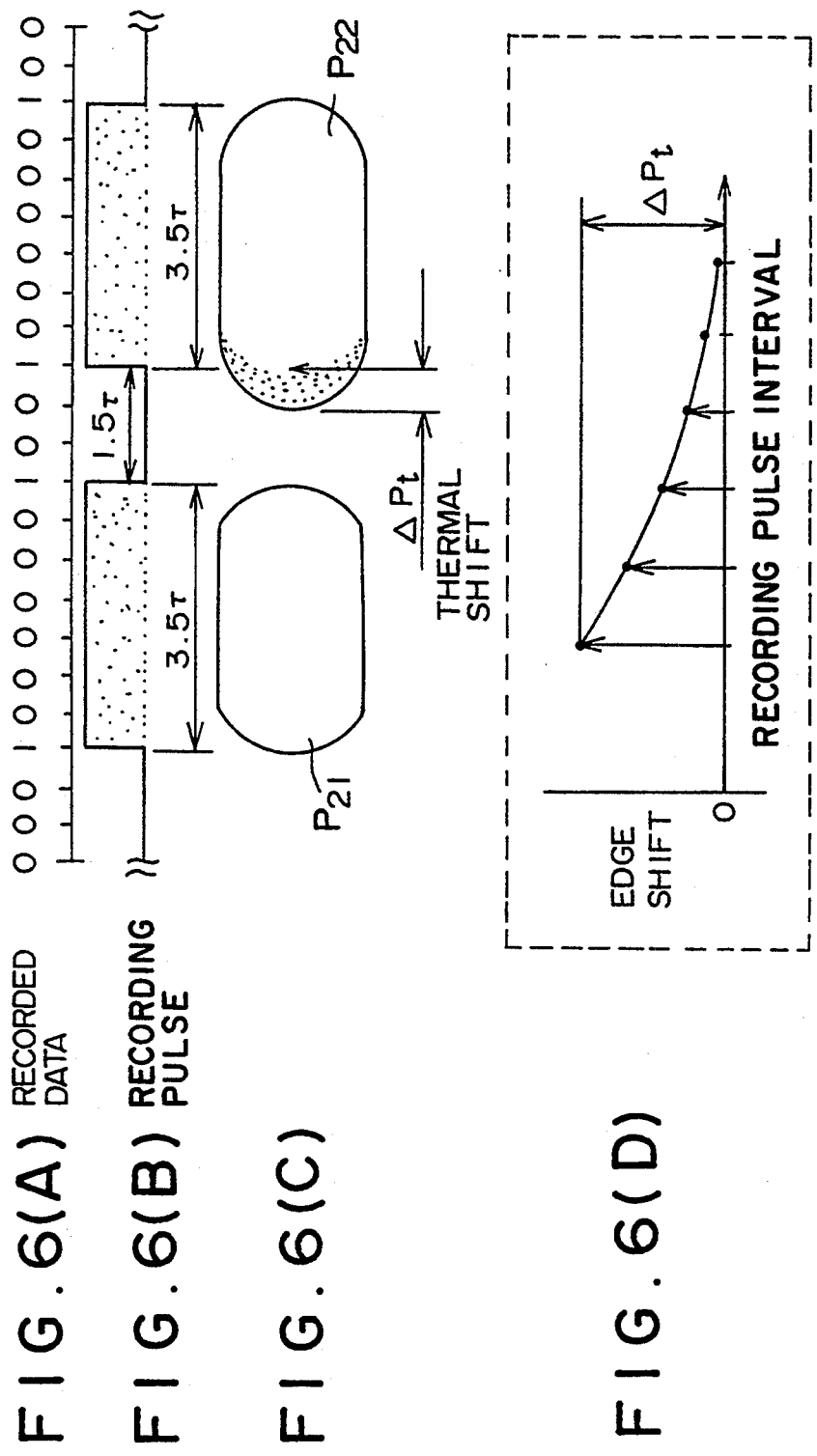
FIGS. 6(A) through 6(D) show thermal shift.
Figure 12A:
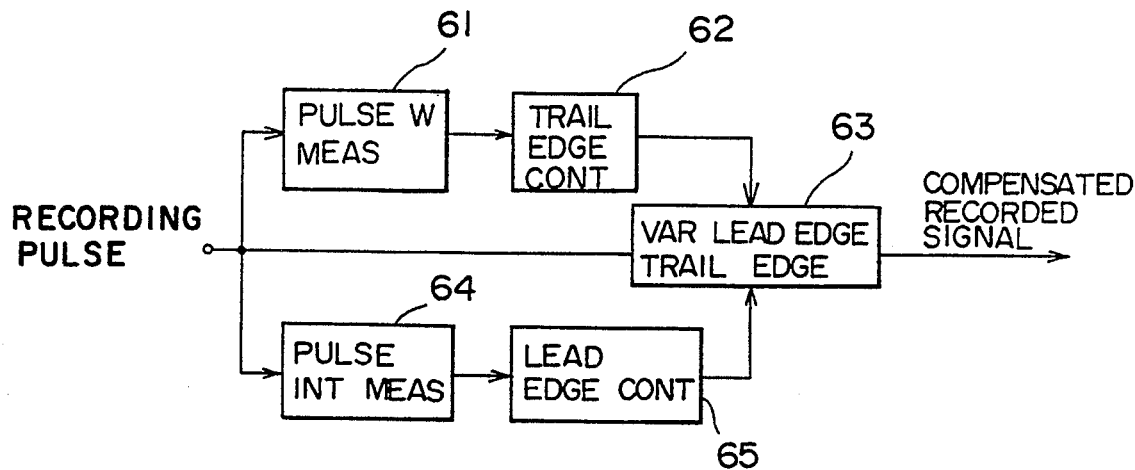
FIGS. 12(A) and 12(B) illustrate the principle of the first invention.
Figure 12B:
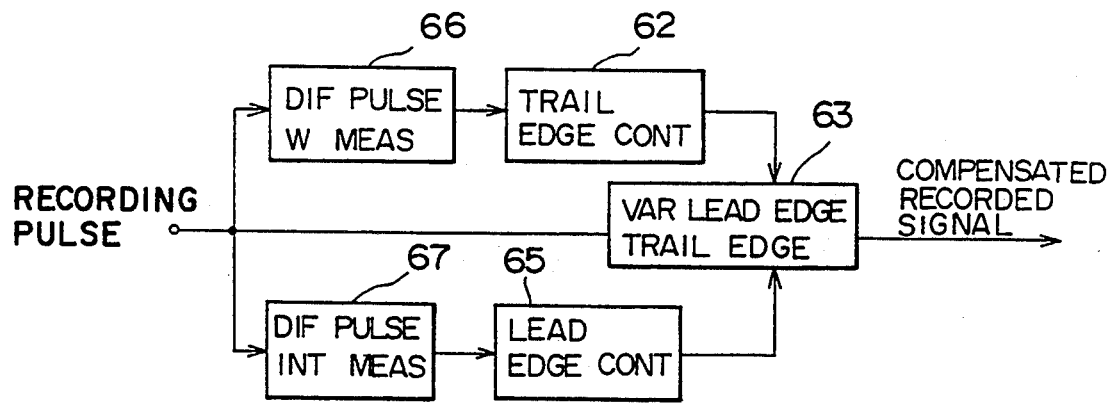

FIGS. 12(A), 12(B) through FIG. 20 relate to embodiments of the first invention. FIGS. 12(A), and 12(B) shows the principle of the first invention. The optical medium, the optical head and the moving mechanism therein are the same as those in FIGS. 1 and 2, and therefore the descriptions thereof are omitted.

In FIG. 12(A), a pulse width measuring means 61 measures the pulse width of the recorded pulse. A fall controlling means 62 controls a variable fall/rise portion 63 in such a manner that the fall of the recording pulse is advanced by a degree in proportion to the measured pulse width. A pulse interval measuring means 64 measures the pulse interval of the recording pulse. A rise controlling means 65 controls the variable fall/rise portion 63 in such a manner that the rise of the next recorded pulse is delayed by a degree in inverse proportion to the measured pulse interval.

In FIG. 12(B), a difference pulse width measuring means 66 measures a difference obtained by subtracting the preceding pulse interval from the pulse width of the recording pulse. The fall controlling means 62 controls the variable fall/rise portion 63 in such a manner that the fall of the recording pulse is advanced by a degree in proportion to the difference between the measured pulse width and the preceding pulse interval. A difference pulse interval measuring means 67 measures a difference obtained by subtracting the preceding pulse width from the pulse interval of the recording pulse. The rise controlling means 65 controls the variable fall/rise portion 63 in such manner that the rise of the next recording pulse is delayed by a degree in inverse proportion to the difference between the measured pulse interval and the preceding pulse width.

As described above, it is found, as shown in FIG. 12(A), that a compensation is possible in which the pattern shift amount is regular regardless of the recorded data pattern, by advancing the fall by a degree in proportion to the pulse width. It is also found that a compensation is possible in which thermal shift amount is regular regardless of the recorded data pattern, by delaying the rise by a degree in inverse proportion to the pulse interval.

It is found, as shown in FIG. 12(B), that the pattern shift amount is regular regardless of the extent to which the recording pulse and the preceding pulse interval vary, by advancing the fall by a degree in proportion to the difference obtained by subtracting the preceding pulse interval from the pulse width. It is also found that the thermal shift amount is regular regardless of the extent to which the pulse interval and the preceding recording pulse vary, by delaying the rise by a degree in inverse proportion to the difference obtained by subtracting the preceding pulse width from the pulse interval.

Figure 13:
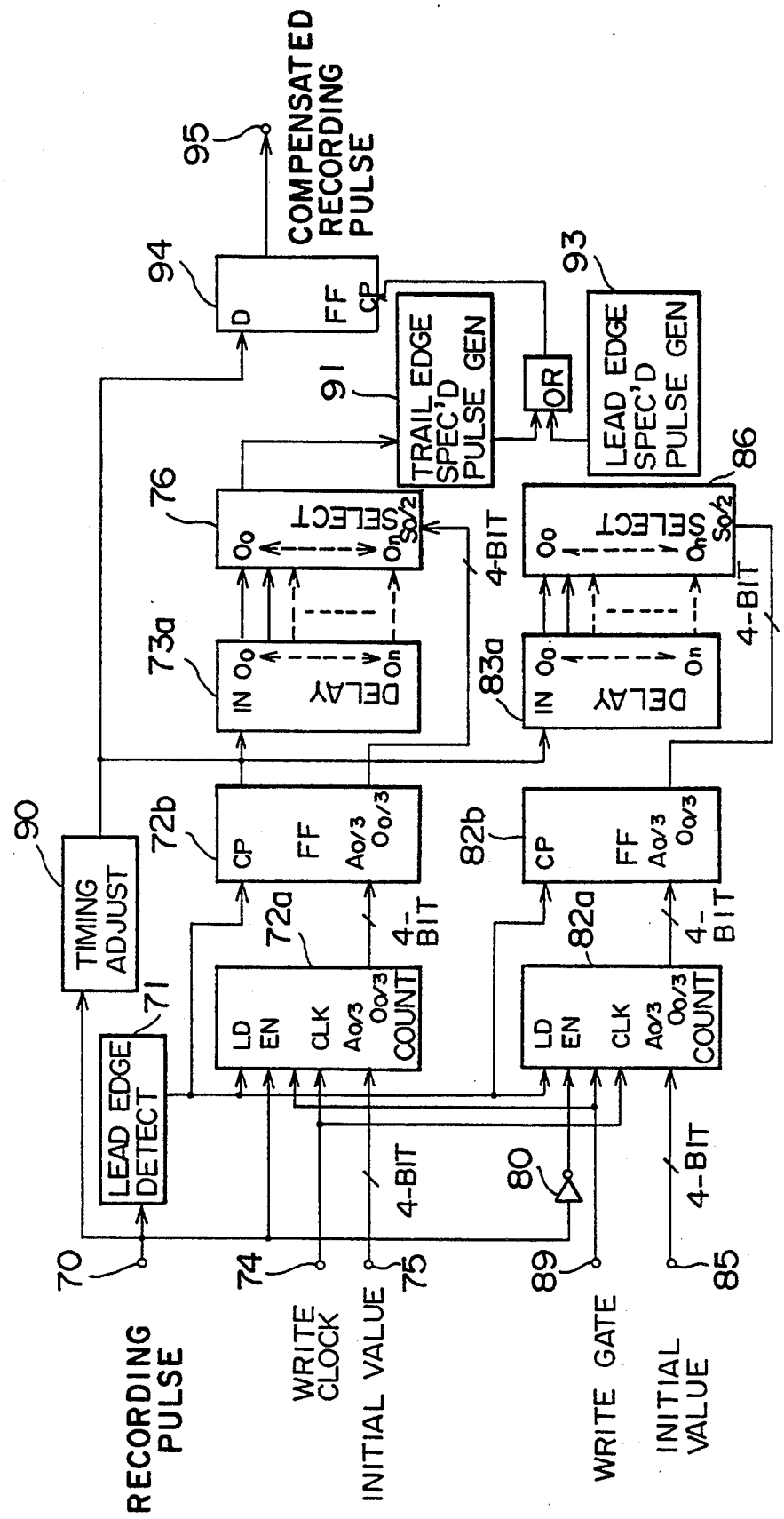
FIG. 13 is a block diagram of an embodiment of the first invention.
Figure 14:
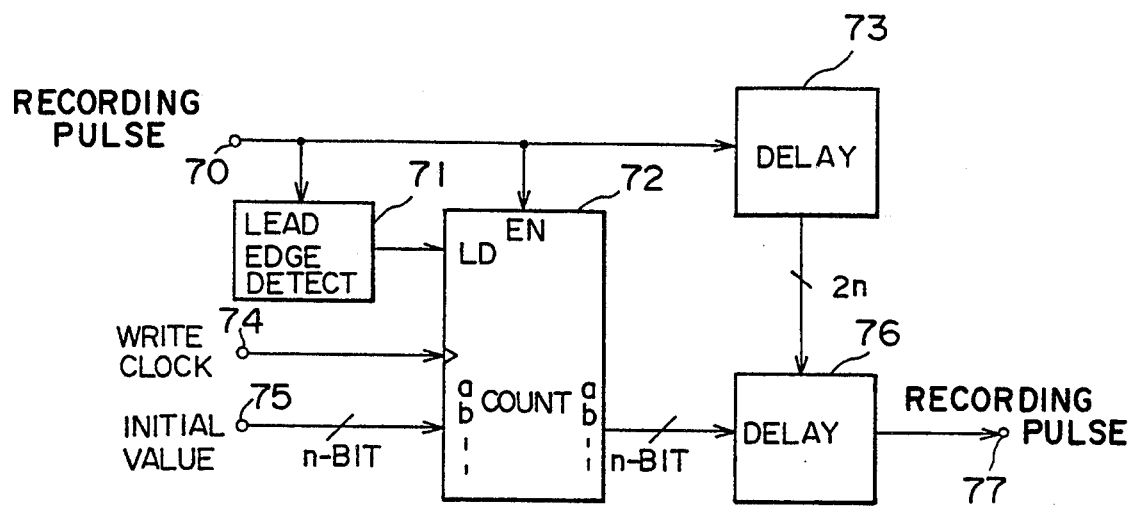
FIGS. 14 and 15 are schematic block diagrams of the essential part of FIG. 13.
Figure 15:
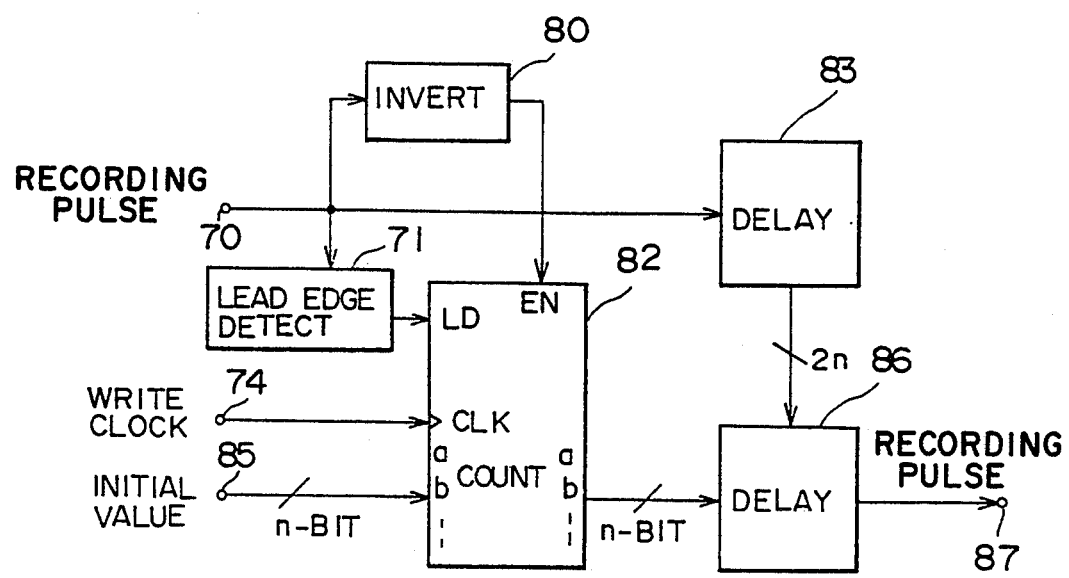
Figure 16:
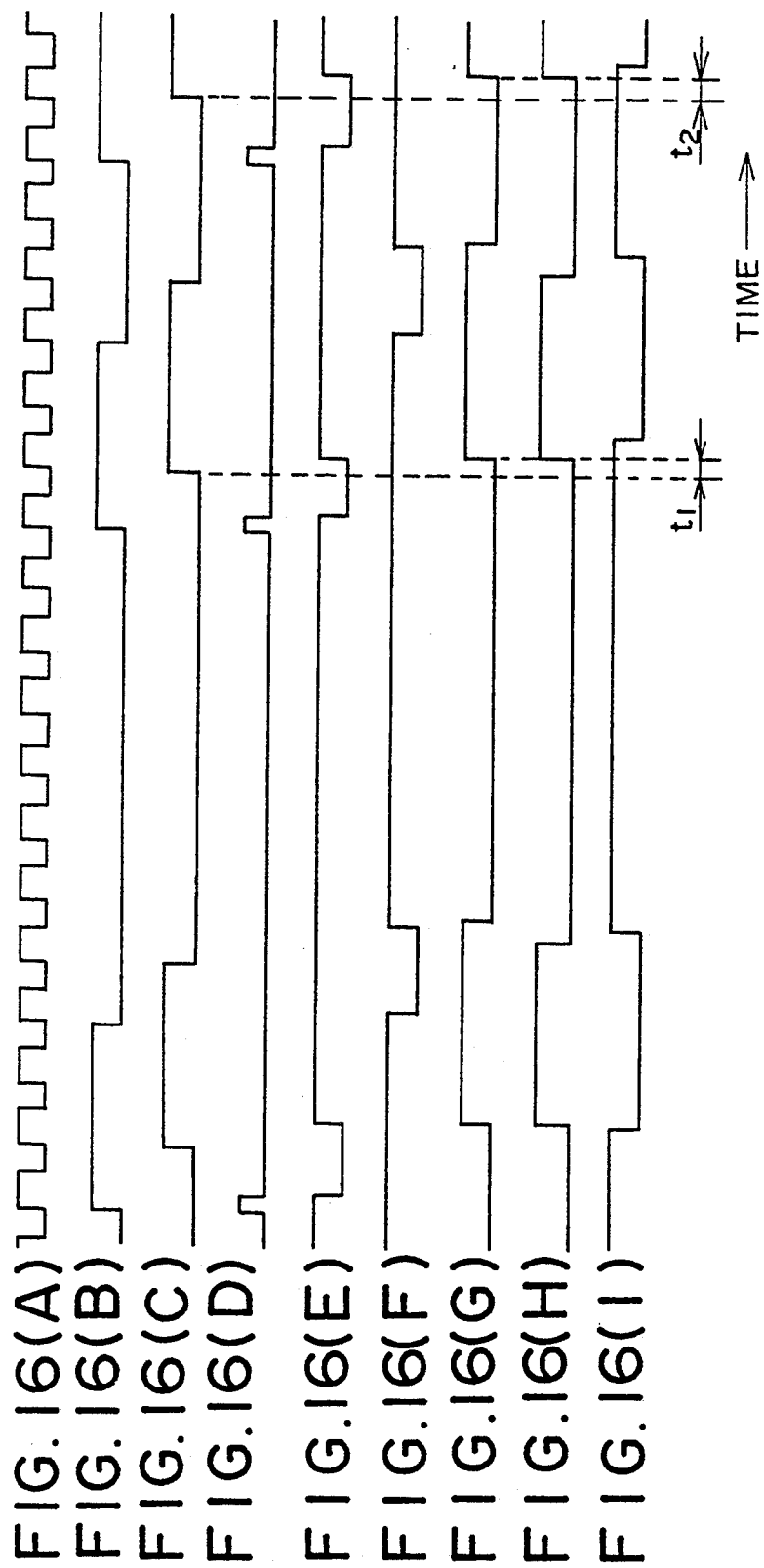
FIGS. 16(A) through 16(I) and FIGS. 17(A) through 17(I) are timing charts for signals of FIG. 13.
Figure 17:
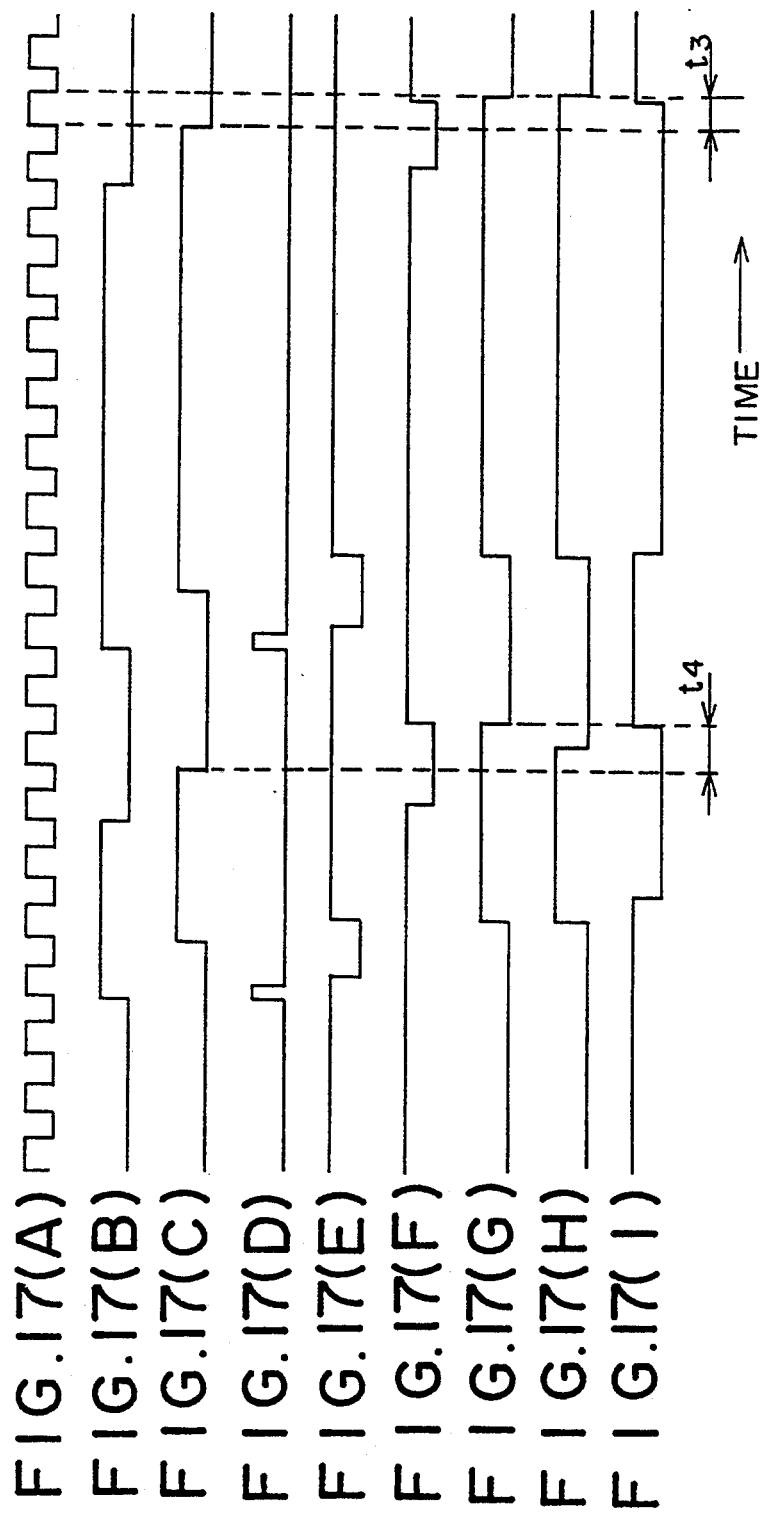

FIG. 13 is a block diagram of an embodiment of the first invention; and FIGS. 14 and 15 are schematic block diagrams of the essential part of FIG. 13. In FIGS. 13 through 15, like parts are given like reference numerals. FIGS. 16(A) through 16(I) and FIGS. 17(A) through 17(I) are signal timing charts for portions of FIG. 13. FIGS. 16 (A) through 16 (I) show how the point of time of the rise of the recording pulse is controlled, and correspond to correction of thermal shift. FIGS. 17(A) through 17(I) describe how the point of time of the fall of the recorded pulse is controlled, and correspond to correction of pattern shift.

Referring to FIG. 14, a terminal 70 is fed the recording pulse as shown in FIG. 17(B), which pulse is supplied to a rise detector 71, an enable terminal EN of a counting circuit 72 and a delay circuit 73. The rise detector 71 detects the rise edge of the recording pulse, generates a rise detection signal as shown in FIG. 17(D) and supplies the same signal to a load terminal, LD of the counting circuit 72. The counting circuit 72 is supplied with a write clock and an initial value through terminals 74, 75, respectively. The write clock shown in FIG. 17(A) is a synchronizing signal for generating the recording pulse. For example, (2,7) RLL code, used as such synchronizing signal, is a signal having a period corresponding to the bit interval of the recorded data. For example, the initial value is normally zero, but may be a predetermined value corresponding to the variation of the ambient temperature.

When the input of the rise detection signal arrives, the counting circuit 72 has its initial value, supplied through the terminal 75, preset, adds, to the count, the write clock applied to the circuit during the high-level period of the recording pulse, and supplies an n-bit (n being 4, for example) count to a selection circuit 76.

The delay circuit 73 delays the recorded pulse and supplies, to the selection circuit 76, the $2^n$ recording pulse having different delay time values for enit unit time t. The selection circuit 76 selects, on the basis of the count submitted by the counting circuit 72, the recording pulse in such a manner that the greater the count, the shorter the delay time of the pulse selected, and outputs the selected recording pulse from a terminal 77, as shown in FIG. 17(I). The delayed recording pulse of FIG. 17(I) is a negative logic waveform.

It is thus ensured that the recording pulse is output from the terminal 77 such that the longer the high-level period of the recording pulse, the smaller the delay amount of the output pulse. In other words, the longer the high-level period, the more advanced the fall of the output recording pulse.

Referring to FIG. 15, a terminal 70 is fed the recording pulse as shown in FIG. 16(B), which pulse is supplied to a rise detector 71, an inverter 80 and a delay circuit 83. A counting circuit 82 is supplied with a write clock (FIG. 16(A)) and an initial value through terminals 84, 85, respectively. The initial value is normally zero, but may be a predetermined value corresponding to the variation of ambient temperature.

When the input of the rise detection signal arrives, the counting circuit 82 has its initial value preset, adds, to the count, thaw rite clock applied to the circuit during the high-level period of the recording pulse that is the result of inversion by the inverter 80, in other words, during the low-level period of the original recording pulse, and supplies an n-bit (n being 4, for example) count to a selection circuit The delay circuit 83 delays the recording pulse and supplies, to the selection circuit 86, the $2^n$ recording pulse having different delay time values for each unit time t. The selection circuit 86 selects, on the basis of the count submitted by the counting circuit 82, the recording pulse in such a manner that the smaller the count, the longer the delay time of the pulse selected, and outputs the selected recording pulse from a terminal 87, as shown in FIG. 16(H).

It is ensured thus that the recording pulse is output from the terminal 87 such that the shorter the low-level period of the recording pulse, the greater the delay amount of the output pulse. In other words, the shorter the low-level period, the more delayed the rise.

Referring once more to FIG. 13, counters 72a, 82a and flip-flops 72b, 82b constitute the counting circuits 72, 82. The counters 72a, 82a conduct counting as shown with reference to FIGS. 14, 15, respectively. The counts submitted therefrom are supplied to the flip-flops 72b, 82b, respectively. The counts are latched when the rise detection signal arrives, and are supplied from the flip-flops 72b, 82b to the selection circuits 76, 86, respectively.

The counters 72a, 82a latch the initial value supplied through the terminals 75, 85, respectively, when a write gate signal arrives from a terminal 89, and the counters preset the latched initial value when the rise detection signal is supplied thereto.

The recording pulse from the terminal 70 is subject to timing adjustment by being delayed, by means of a timing adjusting portion 90, a predetermined time, as shown in FIGS. 16(C), 17(C), and is supplied to delay circuits 73a, 83a. The delay circuits 73, 83 of FIGS. 14, 15 correspond to the timing adjusting portion 90 and the delay circuits 73a, 83a. The timing adjusting portion 90 is provided for the purpose of harmonizing the timing of the delayed recording pulse, selected by the selection circuits 76, 86, and the timing of the count.

The recording pulse of FIG. 17(I) having its fall timing varied in correspondence to the high-level period duration, which pulse is selected by the selection circuit 76, is supplied to a fall specified pulse generating portion 91, in which portion the point of time of the fall is specified. The fall specified pulse (FIG. 17(F)) thus obtained is supplied to a clock input terminal of a D flip-flop 94 via an OR circuit 92.

The recording pulse of FIG. 16(H) having its rise timing varied in correspondence to the low-level period duration, which pulse is selected by the selection circuit 86, is supplied to a rise specified pulse generating portion 93, in which portion the point of time of the fall is specified. The rise specified pulse (FIG. 16(E)) thus obtained is supplied to a clock input terminal of the D flip-flop 94 via the OR circuit 92.

The data input terminal of the flip-flop 94 is supplied with the recording pulse from the timing adjusting portion 90. The flip-flop 94 latches the recording pulse at a timing when a rising pulse or a falling pulse is supplied from the OR circuit 92, and outputs the same from a terminal 95 as a compensated recording pulse shown in FIGS. 16(G), 17(G), which compensated pulse is used in actual recording.

The compensated recording pulse has its fall advanced with respect to the uncompensated recording pulse by a degree in proportion to the width so that the pattern shift amount $\Delta P_p$ may be regular (for example, zero) regardless of the recording pulse width. The compensated recording pulse is also configured such that the shorter the uncompensated recording pulse interval, the more delayed the rise of the next recording pulse so that the thermal shift amount $\Delta P_t$ may be regular (for example, zero) regardless of the recording pulse interval. Accordingly, both pattern shift and thermal shift are compensated for.

A description will now be given of how the point of time of the rise and fall is controlled, with reference to FIGS. 16(A) through 16(I) and FIGS. 17(A) through (I). It is learned by comparing the point of time of the rise of the recording pulse of FIG. 16(C), which pulse is obtained after timing adjustment, with the point of time of the rise of the compensated recording pulse of FIG. 16(G), that a difference $t_1$, for the longer pulse interval, is shorter than the difference $t_2$ for the shorter pulse interval. It is evident from this that the shorter the interval of the uncompensated recording pulse, the more delayed the rise of the next recording pulse.

It is learned by comparing the point of time of the fall of the recording pulse of FIG. 17(C), which pulse i.e. obtained after timing adjustment, with the point of time of the fall of the compensated recording pulse of FIG. 17(G), that the difference $t_3$, for the longer pulse width, is shorter than the difference $t_4$ for the shorter pulse width. It is evident from this that the greater the width of the uncompensated recording pules, the more advanced the fall of the recording pulse.

Figure 18:
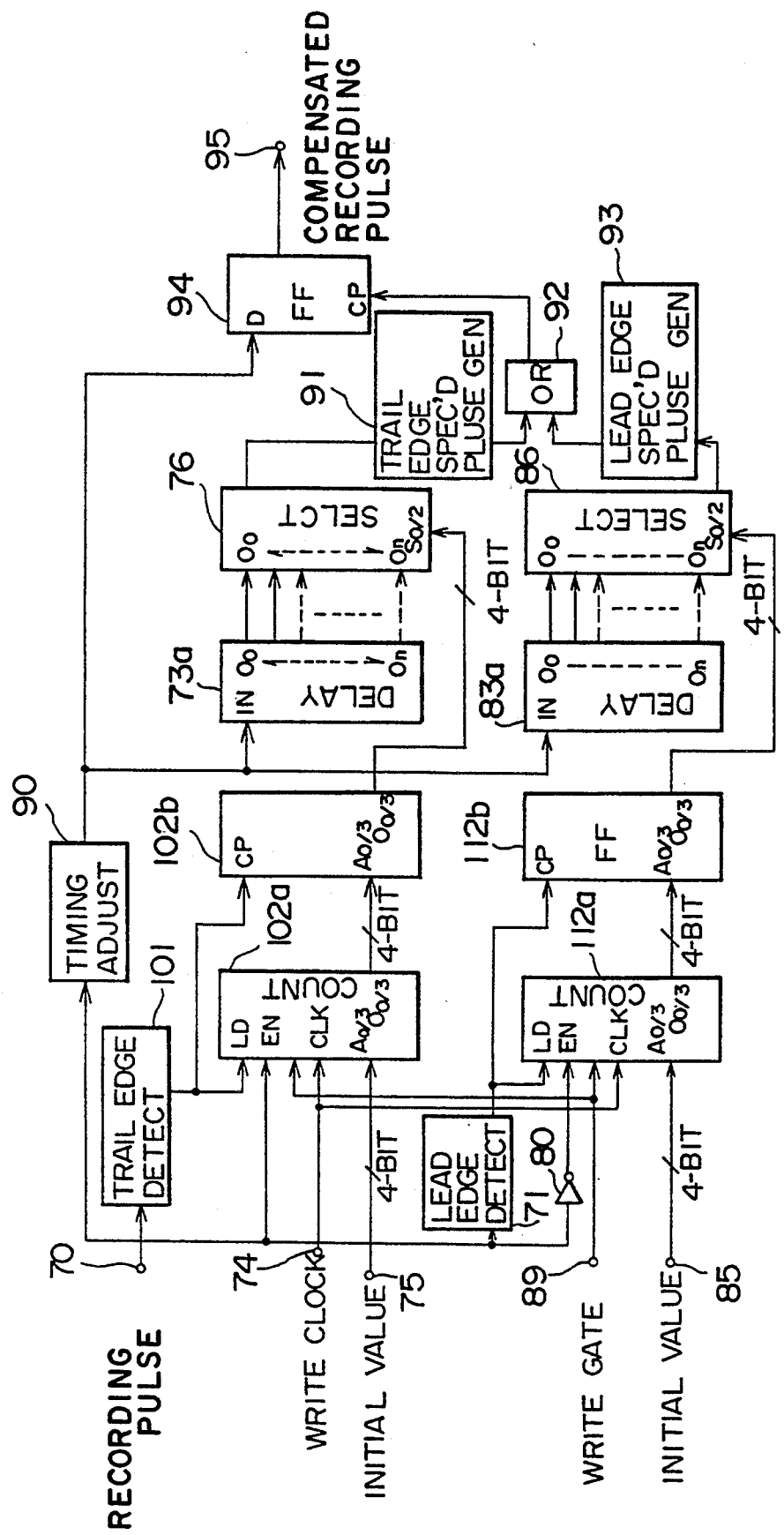
FIG. 18 is a block diagram of another embodiment of the first invention.
Figure 19:
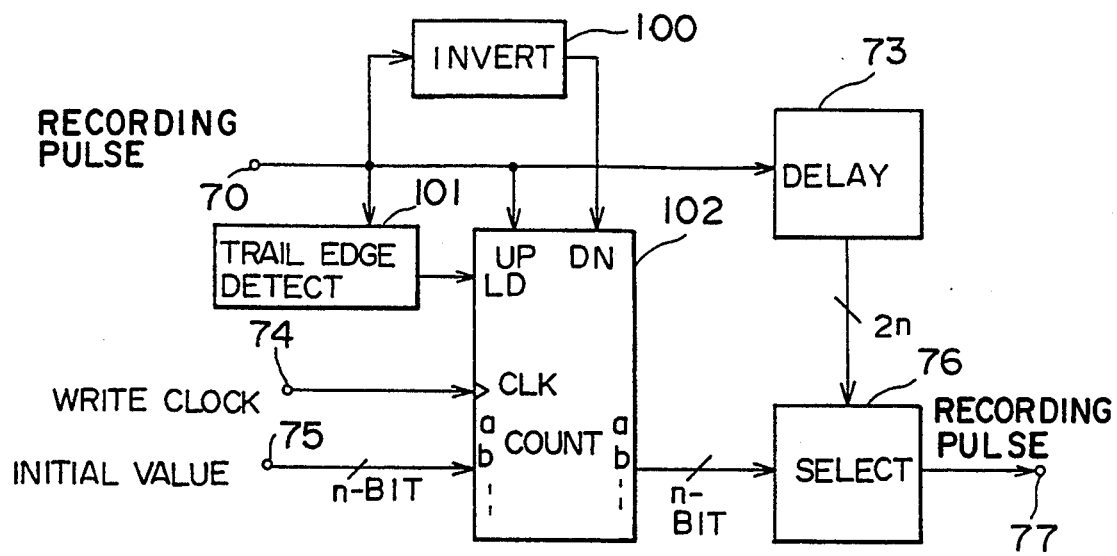
FIGS. 19 and 20 are schematic block diagrams of the essential part of FIG. 18.
Figure 20:
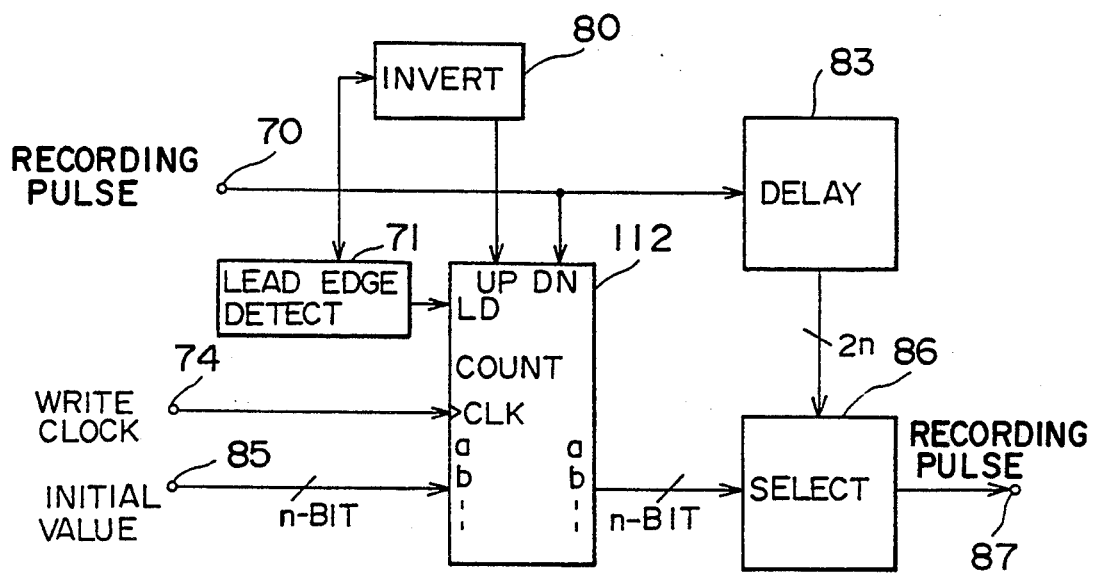

FIG. 18 is a block diagram of another embodiment of the first invention; and FIGS. 19 and 20 are schematic block diagrams of the essential part of FIG. 18. In FIGS. 18 through 20, parts that are the same as those in FIGS. 13 through 15 are given the same reference numerals, and the descriptions thereof are omitted.

In FIG. 19, an inverter 100 inverts the recording pulse and supplies the result to a down enable terminal DN of a counting circuit 102. A fall detector 101 detects the fall of the recording pulse and supplies the fell detection signal to a load terminal LD of the counting circuit 102. The counting circuit 102 has its initial value preset when the fall detection signal arrives, and subtracts, from the count, a write clock arriving during the low-level period of the recording pulse. The counting circuit 102 also adds, to the count, a write clock arriving during the high-level period of the recording pulse supplied to an up enable terminal UP, and supplies an n-bit count to the selection circuit 76.

That is, the counting circuit 102 determines the difference between the high-level period of the recording pulse and the preceding low-level period. The selection circuit 76 selects the recording pulse such that the greater the count, the shorter the delay time of the pulse selected, and outputs the selected pulse from the terminal 77.

Referring to FIG. 20, a counting circuit 112 is supplied with the rise detection signal through the load terminal LD and with the recording pulse which is the result of inversion by the inverter 80 through the up enable terminal UP. The counting circuit 112 is also supplied with the recording pulse from the terminal 70 through the down enable terminal DN and with the write clock as well as the initial value from the terminals 74, 85, respectively.

The counting circuit 112 has its initial value preset when the rise detection signal arrives, and subtracts, from the count, the write clock arriving during the high-level period of the recording pulse, adds, to the count, the write clock arriving during the low-level period of the recording pulse, and supplies the n-bit count to the selection circuit 86.

That is, the counting circuit 112 obtains the difference between the low-level period of the recording pulse and the preceding high-level period. The selection circuit 86 selects the recording pulse such that the smaller the count, the longer the delay time of the pulse selected, and outputs the selected pulse from the terminal 87.

Referring once more to FIG. 18 for further description, counters 102a, 112a and flip-flops 102b, 112b constitute the counting circuits 102, 112, respectively. The counters 102a, 112a conduct counting as shown with reference to FIGS. 19, 20, respectively. The counts submitted therefrom are supplied to the flip-flops 102b, 112b, latched when the rise detection signal or the fall detection signal arrive, and supplied from the flip-flops 102b, 112b, to the selection circuits 76, 86, respectively.

The counters 102a, 112a latch the initial value supplied from the terminals 75, 85, when the write gate signal arrives from a terminal 89, and preset the latched initial value when the fall detection signal or the rise detection signal is supplied to the counters.

In the embodiment of FIG. 18, the compensated recording pulse output from the terminal 95 has its fall advanced by a degree proportional to the difference between the uncompensated recording pulse width and the preceding recording pulse interval. It is thus ensured that the pattern shift amount $\Delta P_p$ is regular (for example, zero) regardless of the recording pulse width and the preceding pulse interval. It is also ensured that the thermal shift amount $\Delta P_t$ is regular (for example, zero) regardless of the recording pulse interval and the preceding recording pulse width, because the recording pulse rise is delayed by a degree in proportion to the difference between the uncompensated recording pulse interval and the preceding recording pulse width. Accordingly, both pattern shift and thermal shift are compensated for.

This way, the first invention enables recording compensation in which the pattern shift amount and the thermal shift amount are regular regardless of the recording data pattern, and is thus exceedingly useful.

While the above embodiment assumes a case where a magneto-optic disk is used, it can also be applied to formation of marks on a read-only optical disk. Further, the optical medium, which is rotated while in use in the above-described case, may also be fixed while in use.

Figure 21:
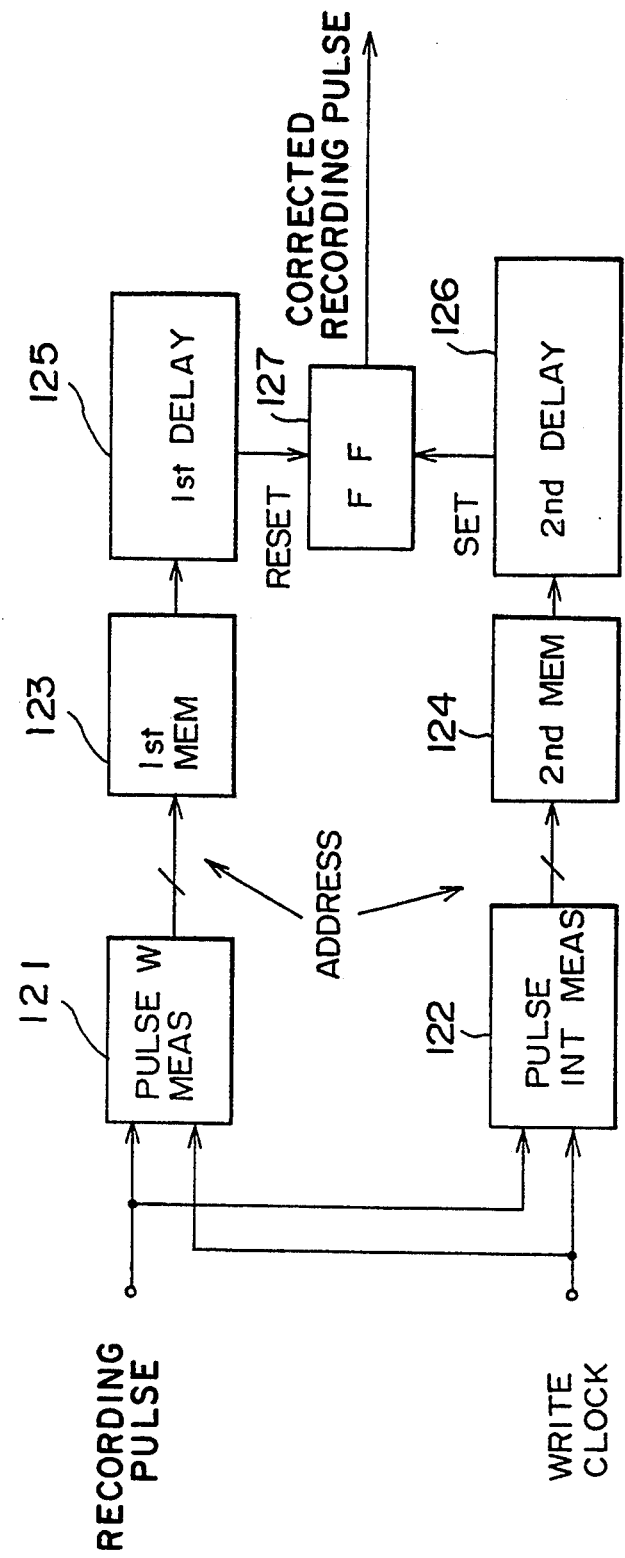
FIG. 21 illustrates the principle of the second invention.

A description will next be given of the second invention. FIG. 21 illustrates the principle of the second invention. Referring to FIG. 21, the second invention is an optical medium recording apparatus in which a light beam, having its light intensity modulated by the recording pulse generated in accordance with the mark length recording method, is impinged upon a magneto-optic disk. The disk has a format in which the information already recorded is reproduced by detecting the variation of the amount of light reflected by the recording surface or by detecting the rotation of the plane of polarization of the reflected light, resulting in the information being recorded as an intermittent series of recording marks, the apparatus being configured such that it comprises:

a pulse width measuring portion 121; a pulse interval measuring portion 122; a first memory 123; a second memory 124; a first delay circuit 125; a second delay circuit 126; and a flip-flop 127.

The pulse width measuring portion 121 measures the pulse width of the recording pulse, which width corresponds to the length of the aforementioned recording mark. The pulse interval measuring portion 122 measures the pulse interval of the recording pulse. The first memory 123 is fed an address input of an output from the pulse width measuring portion 121, and outputs the edge shift correction amount data corresponding to the measured pulse width. The second memory 124 is fed an address input of an output from the pulse interval measuring portion 122, and outputs the edge shift correction amount data corresponding to the measured pulse interval.

The first delay circuit 125 outputs, on the basis of the data output from the first memory 123, the first delay pulse having a delay amount in inverse proportion to the measured pulse width. The second delay circuit 126 outputs, on the basis of the data output from the second memory 124, the second delay pulse having a delay amount in inverse proportion to the measured pulse interval. The flip-flop 127 is supplied with the first and second delay pulses through a reset terminal and a set terminal, respectively, and outputs, from an output terminal, the corrected recording pulse for modulating light intensity of the light beam.

As described above, the second invention allows the flip-flop 127 to be reset by means of the first delay pulse having the delay amount in inverse proportion to the pulse width of the recording pulse, when the mark length recording method effective for improving recording density of the magneto-optic disk is implemented. Thus, the point of time (back edge) of the fall of the corrected recording pulse output from the flip-flop 127 is advanced by a degree in proportion to the pulse width of the recording pulse.

The second invention also allows the flip-flop 127 to be set by means of the second delay pulse having the delay amount in inverse proportion to the pulse interval of the recording pulse. Thus, the point of time (front edge) of the rise of the corrected recording pulse output from the flip-flop 127 is delayed by a degree in inverse proportion to the pulse interval of the recording pulse. It is also to be noted that the second invention enables mutually independent control of the points of time of the rise/fall of the corrected recording pulse.

Figure 22:
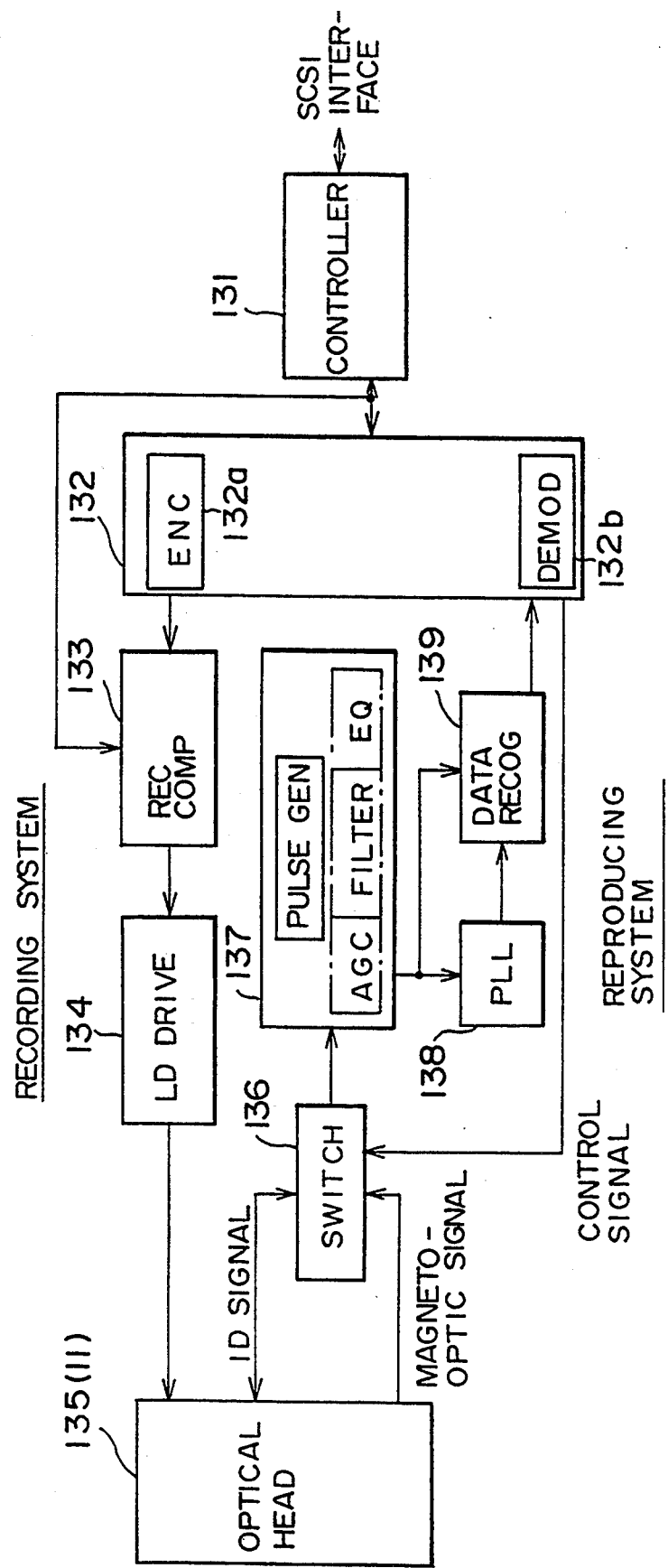
FIG. 22 illustrates the configuration of an embodiment of the second invention.

FIG. 22 illustrates the configuration of an embodiment of the second invention. The configurations of the optical head and the magneto-optic disk are the same as those of FIGS. 1 and 2. This embodiment is characterized in that a recording compensation circuit 133 having a configuration described later is provided in the recording system of the magneto-optic disk recording/reproducing apparatus. The illustration includes the readout system.

In FIG. 22, parts other than the recording compensation circuit are of a known configuration. In the figure, a controller 131 is a control unit responsible for operational control of the entire magneto-optic disk recording/reproducing apparatus, and is connected to an initiator (normally, a computer) via a predetermined interface, while at the same time being connected to a formatter 132 and the recording compensation circuit 133. As the above-mentioned predetermined interface, SCSI (Small Computer System Interface), for example, is used.

When the formatter 132 is in the recording mode, it encodes, by means of an encoder 132a, the input data in the form of an NRZ (non-return to zero) signal into a code [(for example, (2,7) run length limited code)] suitable for mark length recording. When the formatter 132 is in the readout mode, it supplies the encoded data (recording pulse) to the recording compensation circuit 133, and then the formatter 132 decodes, by means of a demodulator 132b, the reproduced signal from a data qualification device 139 into a NRZ signal data.

While the recording is proceeding, the recording compensation circuit 133 measures, as described below, the pulse width and the pulse interval of the input encoded data (recording pulse) by using a predetermined circuit configuration, and generates, on the basis of the measurement result, the corrected recording pulse corrected for the points of time of the pulse rise/fall, which corrected recording pulse is supplied to an LD driving system 134.

The LD driving system 134 is of a configuration in which the corrected recording pulse is fed to the input of the driving circuit of the semiconductor laser (LD). The LD driving system 134 generates a recording light beam and feed the same to the optical head 135 (11), the beam being modulated such that, during the high-level period of the corrected recording pulse, light intensity is great enough for the magneto-optic disk to be heated to such a degree that a reversal in magnetization takes place, and that, during the low-level period of the corrected recording pulse, light intensity is small enough not to cause a reversal in magnetization. Although not shown in the figure, the LD driving system 134 allows, while in a readout mode, the LD to generate a readout light beam of regular light intensity by which no reversal in magnetization is caused.

When in a readout mode, an ID signal, which is a sum signal of light reflected from the magneto-optic disk, and a magneto-optic signal, which is a difference signal, are fed to the input of a switcher 136. Selection of these two signals is based on whether an ID region or a user data region is targeted, respectively. The signal output from the switcher 136 is fed to the input of a reproduction circuit 137, where the signal is turned into a pulse signal after undergoing AGC (Auto Gain control) and allowed to pass through a filter for removing noise at high-frequency range and an equalizer for compensating for resolution, in order to correct the signal level variation due to a medium characteristic or tracking characteristic of the optical head 135. The data pulse gets rid of a clock component by means of a phase locked loop (PLL) 138. A finalized data pulse is generated by a data recognizing device 139 and subjected to a demodulator 132b for detection of the reproduced data. The reproduced data is then subjected to the formatter 132, where recognition of a track number, a sector number and the recorded information is carried out.

Figure 23:
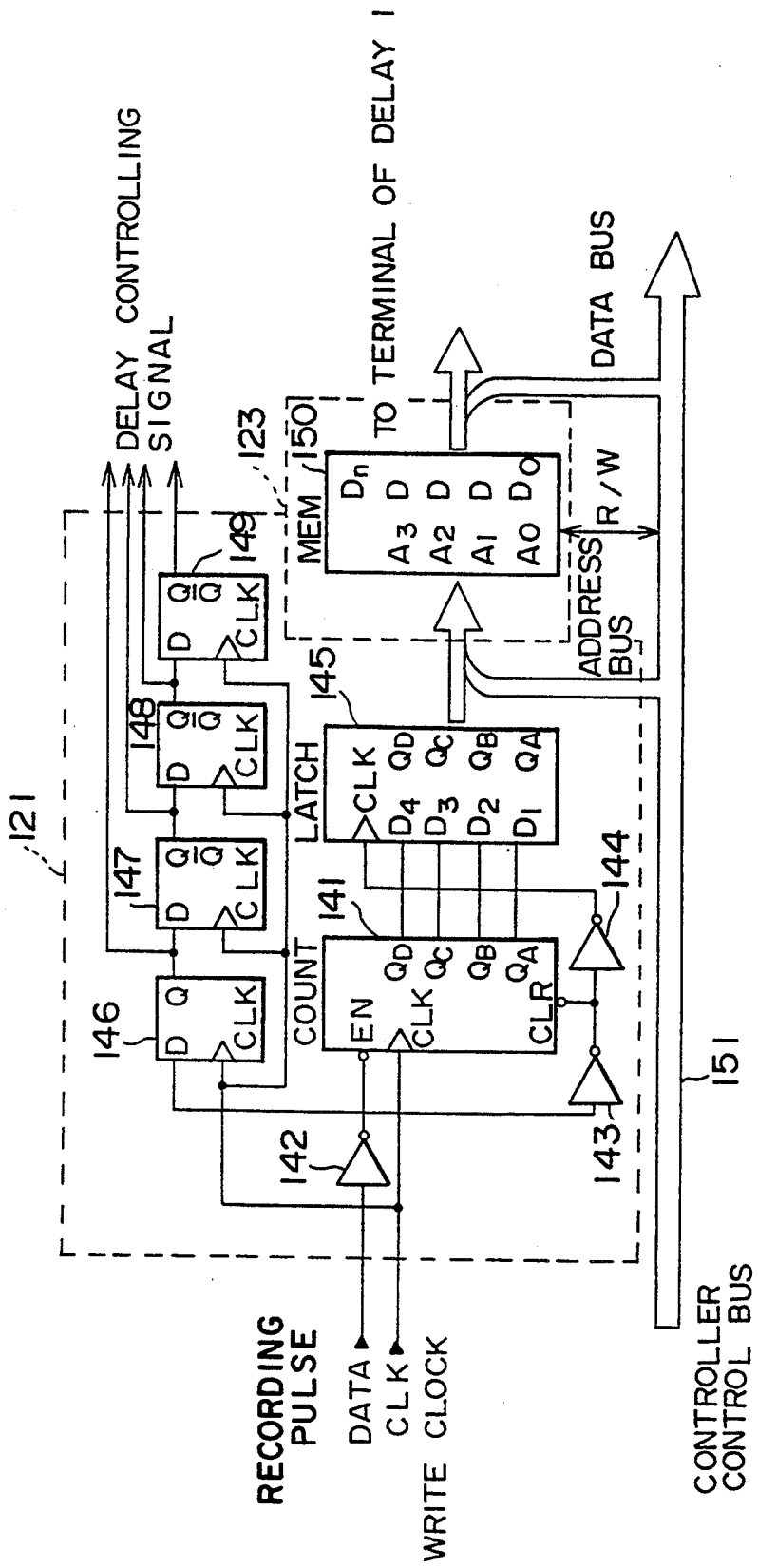
FIG. 23 is a circuit diagram of an embodiment of the essential part of FIG. 22.

A description will next be given of the configuration and operation of the recording compensation circuit 133, which constitutes the essential part of this embodiment. The recording compensation circuit 133 is based on the principle shown in FIG. 21. The circuit diagram of an embodiment of the pulse width measuring portion 121 and the first memory 123 is shown in FIG. 23. Referring to the figure, the pulse width measuring portion 121 comprises a counter 141, inverters 142 through 144, a latch 145 and D flip-flops 146 through 149. The first memory 123 comprises a memory 150.

Output terminals $Q_A$ through $Q_D$ of the counter 141 are connected to data input terminals $D_1$ through $D_4$ of the latch 145. Output terminals $Q_A$ through $Q_D$ of the latch 145 are connected to address input terminals $A_0$ through $A_3$ of the memory 150. The memory 150 stores a table for edge shift correction amounts with respect to a plurality of pulse widths.

Figure 34A:
FIGS. 34(A) and 34(B) show other examples of the trial recording pattern.

A description will be given below of operation of this embodiment, with reference to time charts of FIGS. 24(A) through 24(I) as well as to FIG. 23. The recording pulse as shown in FIG. 34(A), encoded into a format suitable for the mark length recording method, is reversed by the inverter 142 and fed to the enable terminal of the counter 141 and to the data input terminal of the D flip-flop 146. The recording impulse is also fed to a clear terminal of the counter 141 via the inverter 143, and to a clock terminal of the latch 145 via the inverter 144.

The write clock as shown in FIG. 24(B) is applied to the clock terminal of the counter 141, which counter counts the write clock while the enable terminal is at the low level, in other words, during the high-level period of the recording pulse (the pulse width period), and outputs the count as shown in FIG. 24(C). The counter 141 is cleared at the moment that the write clock rises, while the clear terminal is fed the low-level input. Since the write clock and the recorded pulse are synchronized, the above means that the counter is cleared at the moment that the recording pulse falls, as shown in FIGS. 24(A), 24(C).

Because the count submitted by the counter 141 is latched by the latch 145 at the moment that the recording pulse falls, the output of the latch 145 becomes as shown in FIG. 24(D). The count submitted by the counter 141 and latched by the latch 145 is the measurement of the pulse width of the recording pulse, and this count is fed to the input of the address terminal of the memory 150, thereby causing the digital data indicating the delay amount corresponding to the measured pulse width to be read, as shown in FIG. 24(E), and to be output from the memory. The digital data is set such that the greater the measurement of the pulse width of the recording pulse, the smaller the delay amount that the digital data represents. The digital data is fed to the input of the first delay circuit 125. The width of the data bus along which the digital data is transmitted is determined by the delay resolution required, encoding method used and, moreover, by the recording density.

The D flip-flops 146 through 149 constitute the shift register and output the pulse obtained by delaying the recording pulse by a duration n times longer than the period of the write clock (n being an integer). The delayed recording pulse output from the shift register is as shown in FIG. 24(F). This shift register is provided in order to secure an access time for the memory 150 and a set-up time for the subsequent delay circuits 124, 125.

In response to the digital data output from the memory 150, the first delay circuit 125, described later, generates, as shown in FIG. 24(G), a reset pulse provided with a delay time $T_a$ from the point of time of the fall of the delayed recording pulse (FIG. 24(F)), when the measured pulse width of the recording pulse is "3", and generates a reset pulse provided with a delay time $T_b$ ($T_a > T_b$), when the measured pulse width is "7".

The memory 150 is connected to a control bus 151 of the controller 131, and is configured such that the controller 131 modifies the stored data in accordance with the record track number, medium sensitivity and the ambient temperature. The closer to the magneto-optic disk (FIGS. 2, 17) center the position indicated by the record track number is, the more prominent the effect of thermal shift, since the recording wavelength for the magneto-optic disk of a regular angular velocity type becomes proportionally shorter toward the magneto-optic disk center even when the bit period remains the same. In order to deal with such an effect, the data in the memory 150 is modified. Likewise, since the higher the medium sensitivity or ambient temperature is, the more prominent the effect of thermal shift or pattern shift, the data in the memory 150 is modified to deal with such an effect.

The pulse interval measuring portion 122 and the second memory 124 may be of the same circuit configuration as that of FIG. 23 except that the inverter 142 is eliminated. The difference is that the memory 150 stores digital data indicating the delay amount which increases as the pulse interval of the recording pulse become smaller.

Figure 25A:
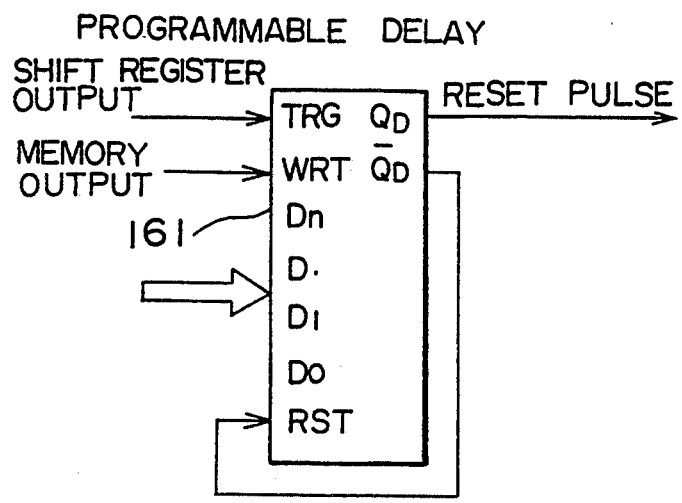
FIGS. 25(A) and 25(B) show a delay circuit.

A description will next be given of the configuration and operation of the first and second delay circuits 125 and 126. FIG. 25(A) illustrates the configuration of an example of the delay circuits 125 and 126. It can be seen from FIG. 25(A) that the delay circuits 125 and 126 are constructed of a programmable delay 161. This programmable delay 161 is fed, through a trigger terminal TRG thereof, with the input of the delayed recording pulse shown in FIG. 24(F) from the shift register constituted of the D flip-flops 146 through 149 shown in FIG. 23, and is also fed, through the data input terminal, with the digital data output from the memory 150.

Figure 25B:
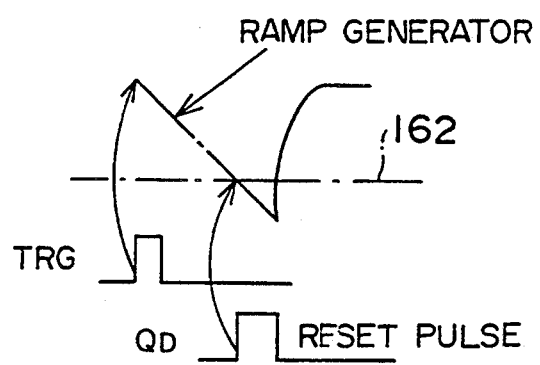

The programmable delay 161 is synchronized to the rise of the delayed recording pulse input thereto through the trigger terminal, which rise is illustrated in FIG. 25(B), and generates a sloping wave having a regular inclination as shown in FIG. 25(B), using an internal ramp generator. The programmable delay compares level of the slope portion of this eloping wave and the reference voltage level 162 indicated by a chain line in FIG. 25(B), which voltage level is obtained by subjecting the digital data, fed to the data input terminal, to an internal D/A converter, and, on the basis of this comparison, generates a reset pulse as shown in FIG. 25(B), outputting the same from the output terminal $D_D$.

The programmable delay of such a configuration is commercially available (for example, AD9500 from Analog Devices Co. Ltd: see pages 8-87–8-97, Analog Devices Co. Ltd Data Book '90/'91), and is configured such that the reference voltage level 162 varies in correspondence to the digital data value fed to the data input terminal, on the basis of which variation the delay time, by which time the output reset pulse is delayed with respect to the input delayed recording pulse, is varied.

Figure 26:
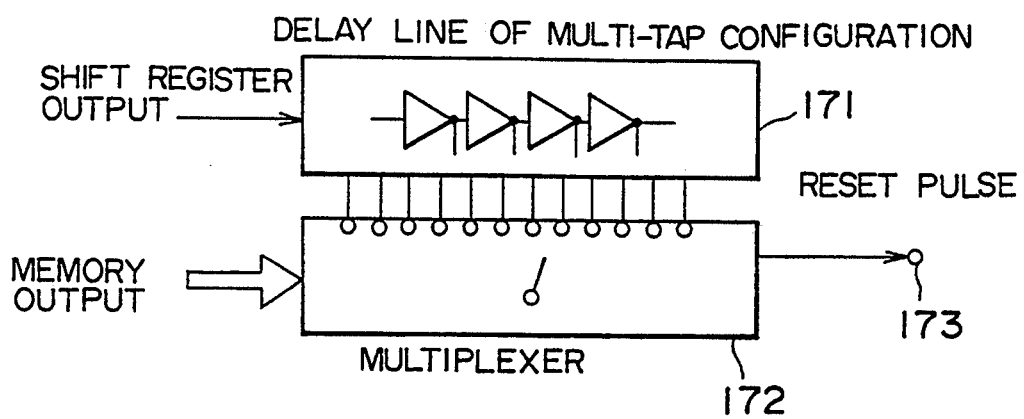
FIG. 26 shows another delay circuit.

FIG. 26 illustrates the configuration of another delay circuit that can be employed as the delay circuits 125 and 126. This circuit comprises a delay line 171 of a multi-tap construction and a multiplexer 172. The delay line 171 of a multi-tap construction utilizes gate elements or passive elements and has a total of m taps, from which taps the delayed output $n \cdot \Delta \tau$ ($\Delta \tau$ is a unit delay time, and $n = 1, 2, \ldots, m$) is output.

The multiplexer 172 selects, in accordance with the value of digital data output from the memory 150, one of the taps from among the total of m taps, and the output of the selected tap is sent to a terminal 173 as the reset pulse. While FIGS. 25(A), 25(B) and 26 show that the output delayed pulse is used as the reset pulse, the output delayed pulse in the case of the second delay circuit 126 is used as the set pulse.

The reset pulse output from the first delay circuit 125 and the set pulse output from the second delay circuit 126 are respectively applied to the input of the reset terminal and the set terminal of the flip-flop 127 shown in FIG. 21. The set pulse is a delayed pulse provided, in accordance with the data output from the second memory 124, with the delay amount which increases as the pulse interval of the recording pulse becomes smaller. Therefore, provided that the recording pulse is as shown in FIG. 24(A), the set pulse rises at a point of time delayed by a relatively long time $L_a$ with respect to the point of time of the rise of the delayed recording pulse shown in FIG. 24(F), when a relatively short pulse interval yielding the count of about 3 is measured; and the set pulse rises at a point of time delayed by a relatively short time $L_b$, when a relatively long pulse interval yielding the count of about 6 is measured.

Accordingly, the corrected recording pulse, which falls when the reset pulse is input and rises when the set pulse is input, is output from the flip-flop 127, as shown in FIG. 24(I), and sent to the LD driving system 134 of FIG. 22.

This corrected recording pulse can generally eliminate the aforementioned pattern shift because the point of time of the fall is advanced so that the pulse width becomes shorter when the pulse width of the recording pulse is relatively long. Further, because the corrected recording pulse has its point of time of the rise delayed so that the pulse interval becomes long when the pulse interval of the recorded pulse is relatively short, the aforementioned thermal shift can be generally eliminated. Moreover, because the second invention is configured such that the delay times $T_a$, $T_b$, $L_a$, $L_b$ are variably set by the controller 131 in correspondence to ambient temperature, medium sensitivity and the recording track number, nearly complete elimination of constant shift as well as pattern shift and thermal shift can be attained.

The second invention is not limited to the above embodiment, but can also be applied to an apparatus having only the recording system since inclusion of the readout system is not a prerequisite. Also, the second invention is not limited to the magneto-optic disk but can also be applied to the recording system for the write-once optical disk, or to the stamper (for example, the pro-groove writer) for fabricating the master substrate of the optical disk. Moreover, the optical medium used in this invention, including the magneto-optic disk of the embodiments, may be fixed instead of being made to rotate.

As has been described above, the present invention enables generation of the corrected recording pulse, in which the point of time of the rise and the point of time of the fall are independently controlled, the controlling being done in accordance with the pulse width and the pulse interval of the recording pulse encoded according to the mark length recording method. Accordingly, pattern shift and thermal shift can be generally eliminated. Also, since the present invention is configured such that the data stored in the memory can be modified by external means, it is characterized by its ability to nearly completely eliminate pattern shift and thermal shift under varying ambient temperatures, medium sensitivities of the optical disk and the recording positions on the optical disk.

A description will next be given of the determination of the delay amount in the delay circuits of the first and second inventions. The delay amount is determined on the basis of trial recordings, and the description thereof will be given below with reference to FIGS. 27-36.

Figure 27:
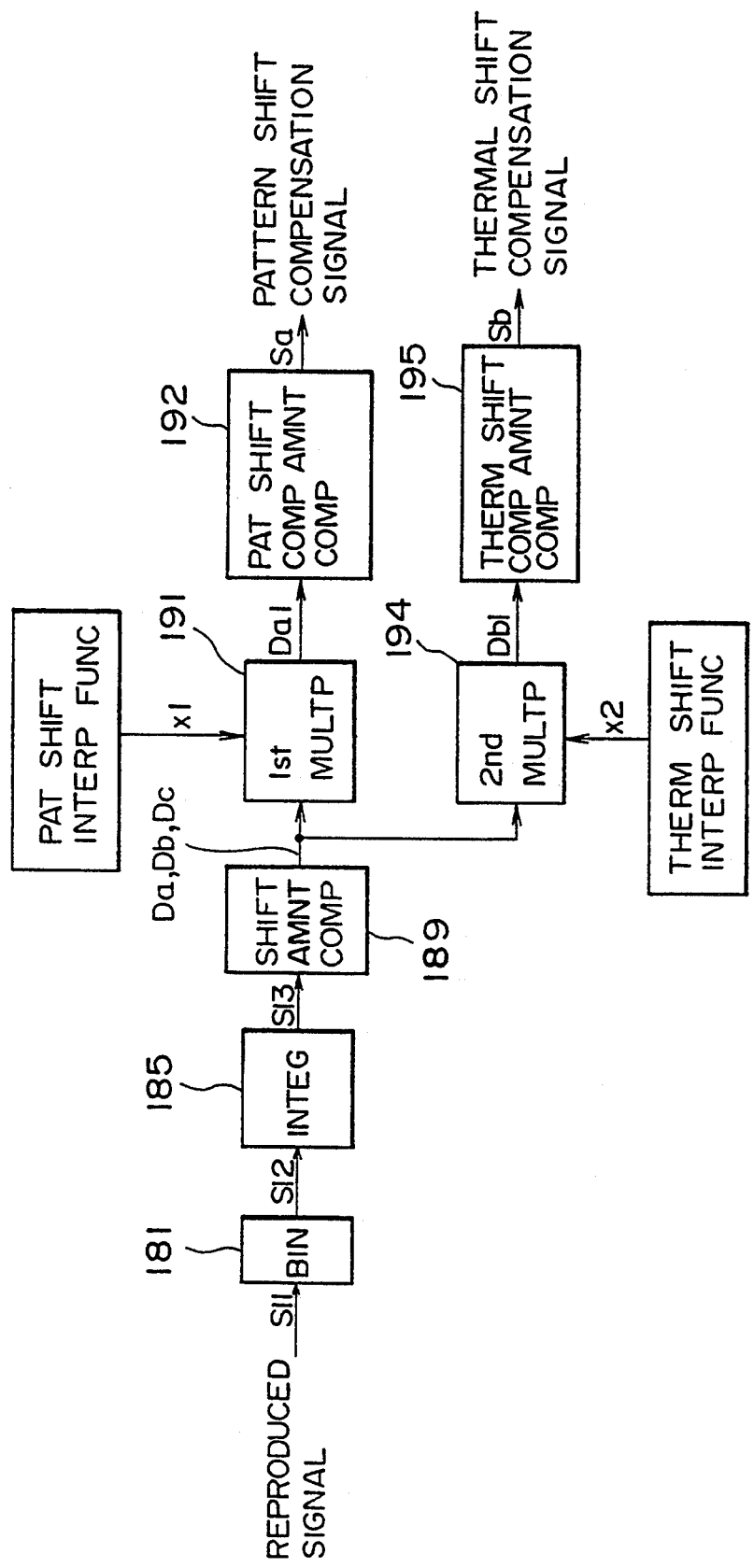
FIG. 27 shows the principle of the third invention.
Figure 28:
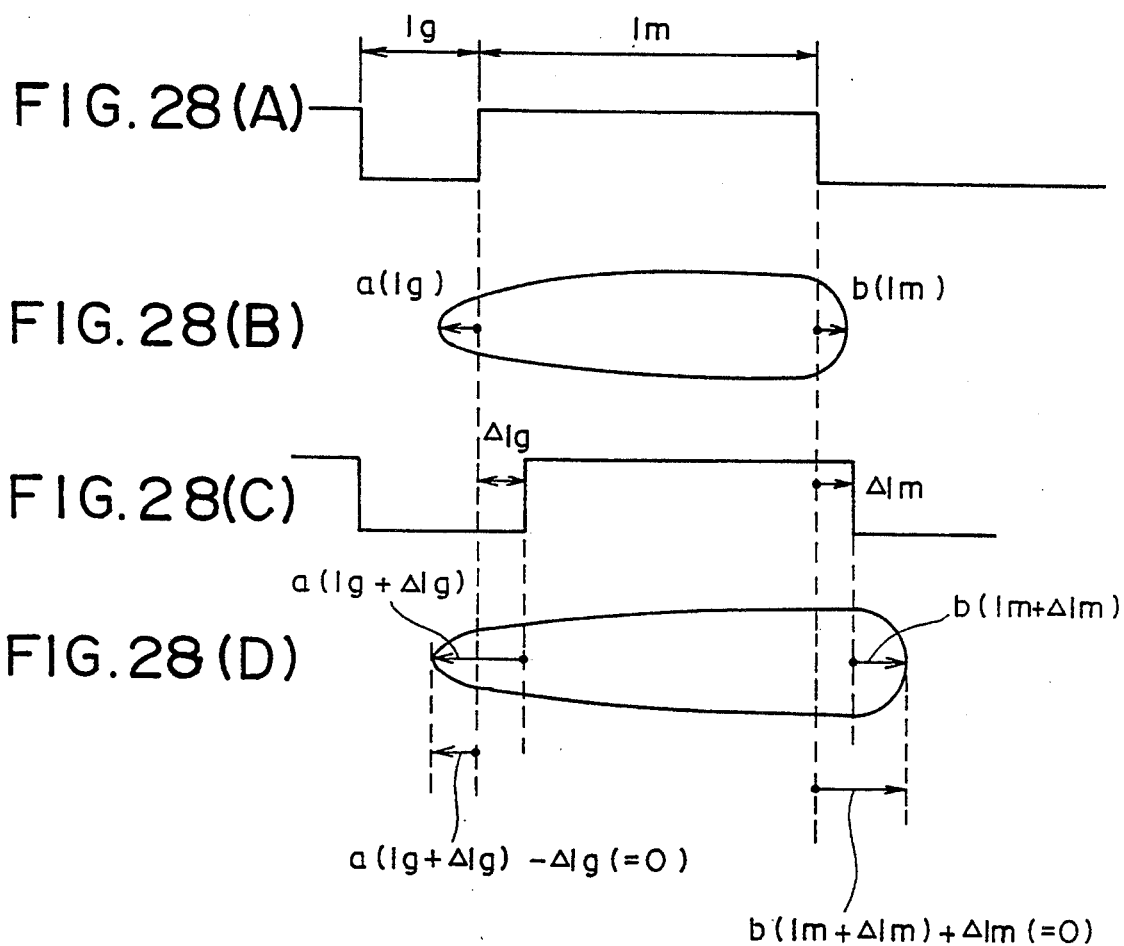
FIGS. 28(A) through 28(D) show the recording compensation amount.

FIG. 27 illustrates the principle of the third invention.

In FIG. 27, 181 indicates a binarizing means for converting a reproduced signal S11 derived from the mark into a binarized signal S12.

185 indicated an integrating means for integrating the binarized signal S12 and outputting an integrated signal S13.

189 indicates a shift amount computing means for obtaining, on the basis of the integrated signal S13, a pattern shift amount Da, a thermal shift amount Db and a constant shift amount Dc.

191 indicates a first multiplying means for obtaining and outputting an interpolation pattern shift data Da1 indicative of the magnitude and direction of pattern shift, by multiplying the edge shift amount Da and a pattern shift interpolation function x1.

192 indicates a pattern shift compensation amount computing means for obtaining, on the basis of the interpolation pattern shift data Da1, the compensation amount for cancelling pattern shift, and for outputting the same as a pattern shift compensation signal $S_a$.

194 indicates a second multiplying means for obtaining and outputting an interpolation thermal shift data Db1 indicative of the magnitude and direction of edge shift due to thermal shift, by multiplying the thermal shift amount Db and a thermal shift interpolation function x2.

195 indicates a thermal shift compensation amount computing means for obtaining, on the basis of the interpolation thermal shift data Db1, the compensation amount for cancelling thermal shift, and for outputting the same as a thermal shift compensation signal $S_b$.

It is desirable that the recorded data patterns used in trial recordings include a pattern alternating between the maximum mark length and the maximum mark interval, a pattern alternating between the maximum mark length and the minimum mark interval and a pattern alternating between the minimum mark length and the maximum mark interval.

The difference between a DC component $S_0$ of the data pattern used in trial recordings, and an integrated value $S_m$, obtained by binarizing the reproduced signal derived from the pattern and by integrating the same, is in proportion to the magnitude of edge shift 1 and is given by $$\Delta 1 = KT(S_m - S_o)/2 \quad (2),$$

where T is a period of the data pattern and K is a detection sensitivity of the integrator (the integrating means 185).

Accordingly, the magnitude of constant shift, pattern shift and thermal shift may be learned by conducting trial recordings for at least three kinds of data pattern and comparing the integrated outputs.

For other patterns, the edge shift characteristics can be learned by postulating an interpolation function and determining the shift magnitude.

FIGS. 28(A) through 28(D) show the recording compensation amount, Recording write power and the compensation amount for the timings of turning the test light on/off are determined as follows from edge shift characteristic.

First, recording write power is determined from the magnitude of constant shift. Thermal shift may be compensated for by the timing of turning the light on, and pattern shift can be compensated for by the timing of turning the light off. As shown in FIG. 28(A), the recording pulse interval of the original data is denoted as 1g and the recording pulse length as 1m; it is found from FIG. 28(C) that the compensation amount for the timing of turning the light on is denoted as $\Delta 1g$ and the compensation amount for the timing of turning the light off is denoted as $\Delta 1m$; and it is found from FIG. 28(B) that an extension (shift amount) of the front edge is denoted as a(1g) and an extension of the back edge is denoted as as b(1m).

Figure 7:
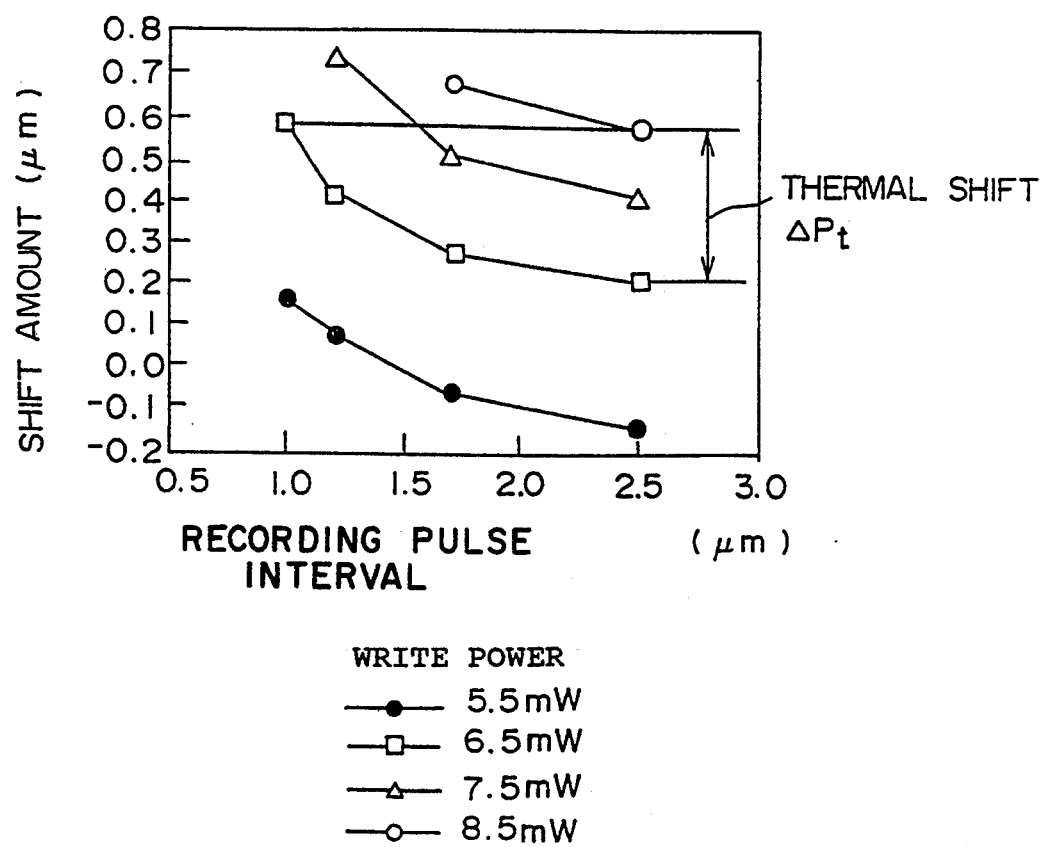
FIG. 7 shows thermal shift characteristic.
Figures 8C, 8D:
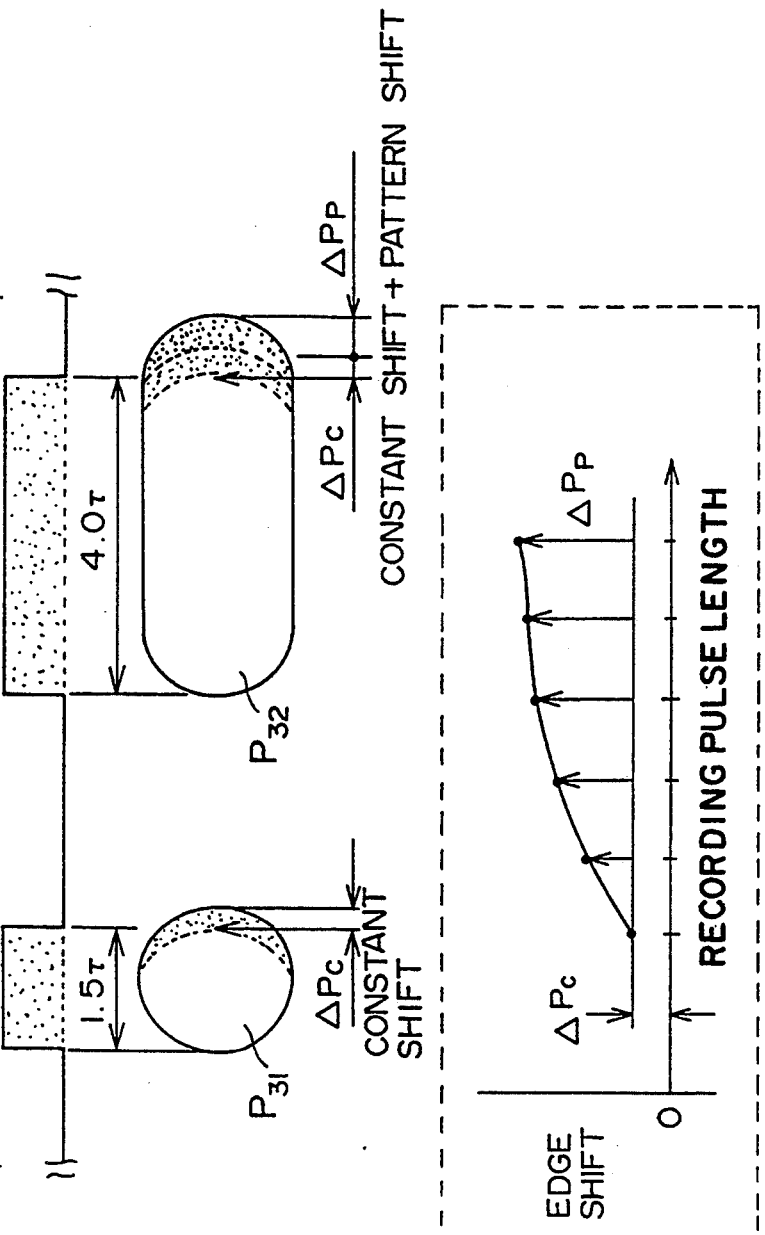
Figure 9:
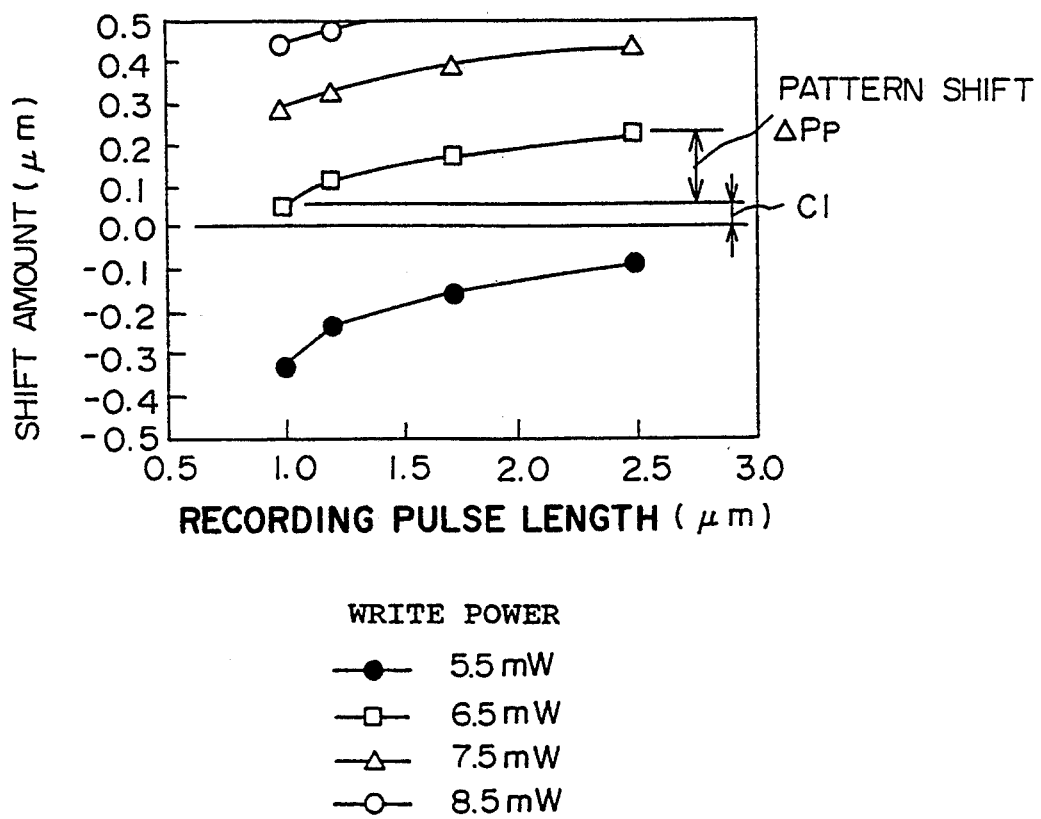
FIG. 9 shows pattern shift characteristics.
Figure 10:
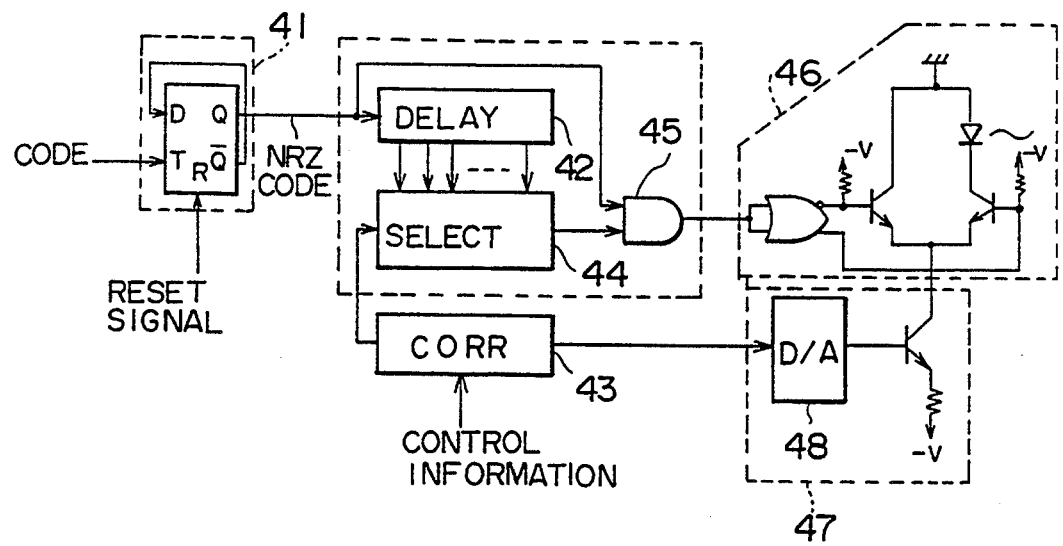
FIG. 10 is a block diagram of the conventional optical disk recording apparatus.
Figure 11:
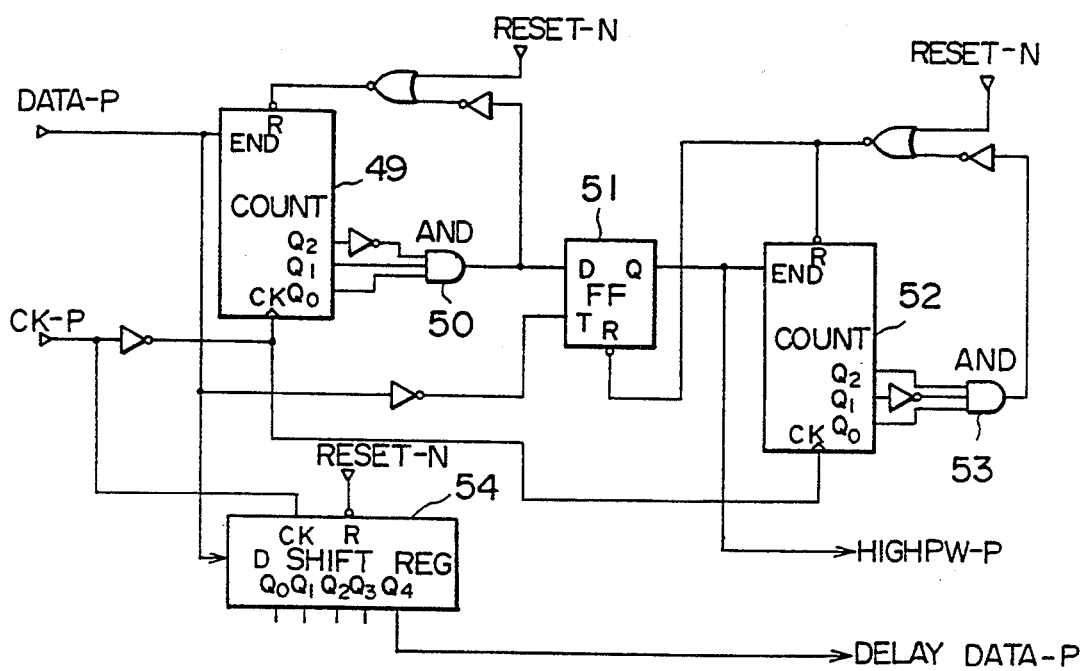
FIG. 11 is a diagram of the circuit for generating the control information of FIG. 10.

In the data pattern, the difference between a(1g) corresponding to the shortest 1g and a(1g) corresponding to the longest 1g is the thermal shift shown in FIG. 7; and the difference between b(1m) corresponding to the shortest 1m and b(1m) corresponding to the longest 1m is the pattern shift shown in FIG. 9.

When the timings of turning on/off the light are compensated for, the compensation amounts $\Delta 1g$, $\Delta 1m$ are added to the shift amounts a(1g), b(1m), with the result that the total amounts become a(1g+1g), b(1m+1m), respectively. The compensation amounts $\Delta 1g$, $\Delta 1m$ should be determined so that the above total amounts may become zero.

The compensation amount $\Delta 1g$ for the front edge shift amount a(1g) is given by the equation (4) below, which equation is a linear approximation of the result of an expansion shown in the equation (3).

$$a(1g+\Delta 1g) = a(1g) + a_0(1g) \cdot \Delta 1g = \Delta 1g \quad (3)$$

$$\Delta 1g = a(1g)/[1 - a_0(1g)] \quad (4)$$

Similarly, the compensation amount $\Delta 1m$ for the back edge shift amount b(1m) is given by $$\Delta 1m = -b(1m)/[1 - b_0(1m)] \quad (5)$$

Figure 29:
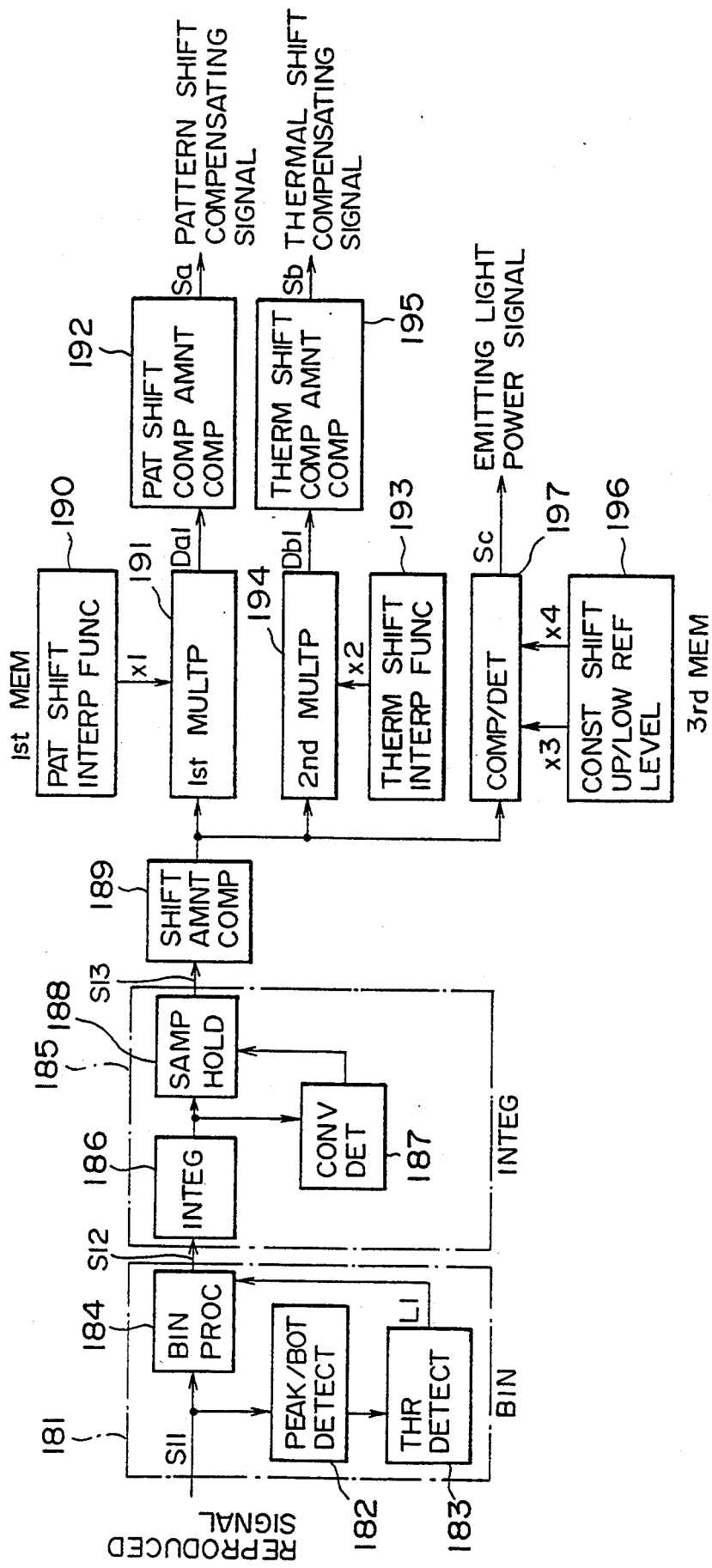
FIG. 29 illustrates an embodiment of the third invention.

FIG. 29 illustrates an embodiment of the third invention. FIG. 29 is a block diagram of the delay circuits of the first and second inventions. FIGS. 30(A) through 30(C) respectively show waveforms of the reproduced signal, the binarized signal and the integrated signal of FIG. 29; and FIGS. 31(A) through 30(C) illustrate trial recording patterns.

The reproduced signal S11 shown in FIG. 29 is obtained by impinging the readout laser light from the LD (not shown in the figure) on a series of marks recorded on the magneto-optic disk (not shown in the figure). An example of the waveform of the same signal is shown in FIG. 30(A).

When conducting trial recordings, it is desirable that the trial recording patterns, for causing the LD to be turned on when recording marks, be patterns in which pattern shift, thermal shift and constant shift appear in a typical fashion when marks are recorded using laser light corresponding to that data pattern.

For example, in the case of a 2/7 modulation code, it is desirable that the recordings include an alternation between the longest mark length 4 $\tau$ and the longest mark interval 4 $\tau$, as shown in FIG. 31(A); an alternation between the longest mark length 4 $\tau$ and the shortest mark interval 1.6 $\tau$, as shown in FIG. 31(B); and an alternation between the shortest mark length 1.5 $\tau$ and the longest mark interval 4 $\tau$, as shown in FIG. 31(C).

In the case of the mark pattern of FIG. 31(C), pattern shift is least likely to occur since its mark length is the shortest; and thermal shift is least likely to occur since the mark interval is the longest. Therefore, denoting the edge shift amount as $\Delta c$, which amount is the difference between zero and the reference level derived from this pattern, $\Delta c$ is caused solely by typical constant shift due to the variation of laser power.

The mark pattern of FIG. 31(A) has the longest mark length, in which pattern heat at the time of mark recording become collected at the back end of the mark, so that the back edge of the mark shows the greatest backward shift. Since the mark interval thereof is the longest, heat coming from the immediately preceding mark recording does not affect the next mark. As constant shift due to the variation of laser power also comes into play, typical pattern shift is obtained by subtracting $\Delta c$ from $\Delta a$, where $\Delta a$ is the shift amount obtained from this pattern.

The mark pattern of FIG. 31(B) has the longest mark pattern and the shortest mark interval, where heat coming from the immediately preceding mark recording most affects the next mark. Because the mark length is the longest in this case, pattern shift as well as constant shift come into play. Hence, typical thermal shift, where the front edge of the mark shows the greatest forward shift, is obtained by subtracting $\Delta a$ and $\Delta c$ from $\Delta b$, where $\Delta b$ is the shift amount obtained in this pattern.

The above-described three mark patterns shown in FIGS. 31(A) through 31(C) are recorded in sequence, and the reproduced signals S11 thereof are fed to the input of the circuit of FIG. 29.

In FIG. 29, 181 indicates a binarizing portion configured by comprising a peek/bottom detection portion 182, a threshold level detection portion 183 and a binarization processing portion 184.

185 indicates an integrating portion configured by comprising an integrating circuit 186, a convergence determination portion 187 and a sample holding portion 188.

189 indicates a shift amount computing portion; and 190 indicates a first memory portion, where the pattern shift interpolation function is stored. 191 indicates a first multiplying portion; and 192 indicates a pattern shift compensation amount computing portion.

193 indicates a second memory portion, where the thermal shift interpolation function is stored. 194 indicates a second multiplying portion; and 195 indicates a thermal shift compensating amount computing portion.

196 indicates a third memory portion, where the constant shift upper and lower reference levels are stored. 197 indicates a comparison/determination portion.

A threshold level L1 shown in FIG. 30(A) is detected by detecting the peak and bottom of the amplitude of the reproduced signal S11 by means of the peak/bottom detection port on 182, and by obtaining the middle point thereof by means of the threshold detection portion 183.

The point of intersection of the reproduced signal S11 and the threshold level L1 is detected by means of the binarization processing portion 184, the points of intersection are designated either as the rising edge and the falling edge, as shown in FIG. 30(B), by detecting the portion of the reproduced signal S11 having a level higher than the threshold level L1 as well as the portion having a level lower than the threshold level. Further, the binarized signal S12 having a square waveform, in which signal the level higher than the threshold level L1 is designated as "H" level, and the level lower is designated as "L" level, is output.

The integrating circuit 186 integrates the binarized signal S12 and outputs the result of integration. Because the time constant is inherent in the circuit, the desired integration level is not reached unless a certain period of time elapses, necessitating a determination, by the convergence determination portion 187, as to whether or not the integration has converged to the desired integration level. The sample holding portion 188 effects sampling on the integrated value determined to have reached convergence, and holds and outputs the same value. As a result of this, the integrated signal S13 having a waveform shown in FIG. 30(C) is output.

The shift amount computing portion 189 determines, by performing operations on the integrated signal S13 in accordance with the equation (2), the magnitude of edge shift, i.e., the above-described shift amounts $\Delta a$, $\Delta b$, $\Delta c$. The computing portion then obtains the constant shift data Dc as $\Delta c$, obtains the pattern shift data Da as $\Delta a - \Delta c$, obtains the thermal shift data as $\Delta b - (\Delta a + \Delta c)$, and then outputs these data.

Figure 32:
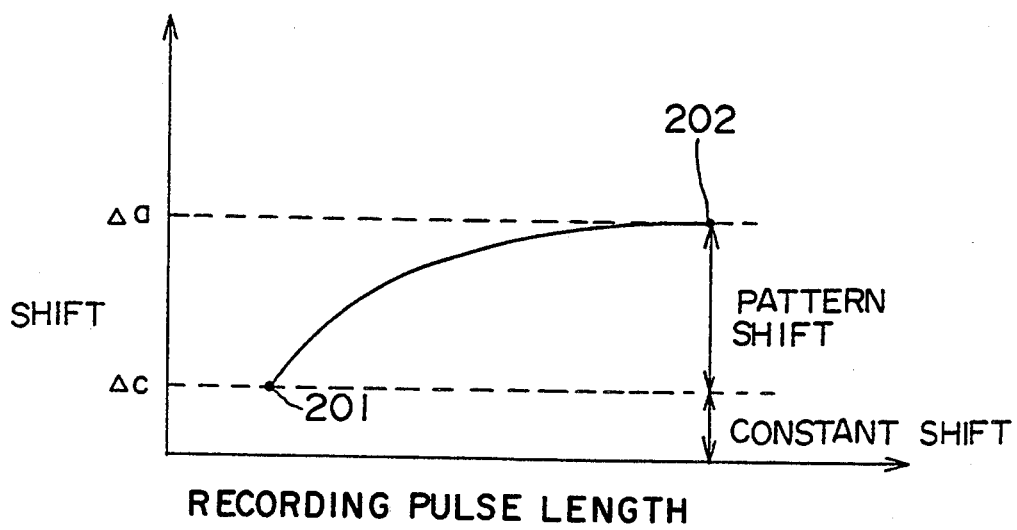
FIG. 32 shows a pattern shift interpolation.

It is intended that the pattern shift interpolation function x1 stored in the first memory portion 190 refers to the magnitude of pattern shift of the cases where the mark length, indicated by numerals 201 and 202 in FIG. 32 describing pattern shift interpolation, is the shortest or the longest, and determines the direction of pattern shift. It is noted that the interpolation function x1 is determined in advance by measuring shift characteristic using a reference magneto-optic disk medium.

That is, the first multiplying portion 191 multiplies the pattern shift interpolation function x1 and the pattern shift data Da, so that the magnitude [b(1m) shown in FIG. 28(B)] and direction of pattern shift of the case of the longest and the shortest mark length are obtained and output. This output data is designated as the interpolation pattern shift Da1.

The pattern shift compensation amount computing portion 192 obtains the compensation amount $\Delta 1m$, by performing operations on the interpolation pattern shift data Da1 in accordance with the aforementioned equation (5), The compensation amount 1m is designated as the pattern shift compensation signal Sa.

The timing of turning off the LD for outputting laser light is adjusted in accordance with the pattern shift compensation signal Sa so that the back edge shift may not occur.

Figure 33:
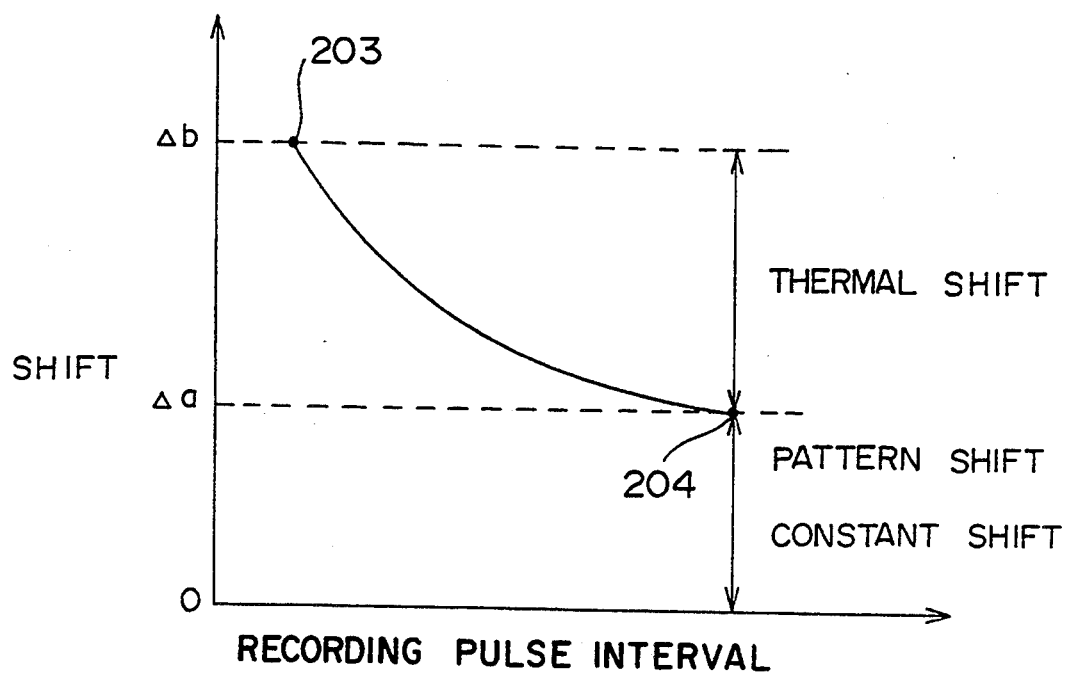
FIG. 33 shows a thermal shift interpolation.

It is intended that the thermal shift interpolation function x2 stored in the second memory portion 193 refers to the magnitude of thermal shift of the cases where the mark interval indicated by numerals 203 and 204 in FIG. 33 describing thermal shift interpolation is the shortest and the longest, and determines the direction of thermal shift. It is noted that the interpolation function x2 is determined in advance by measuring shift characteristic using a reference magneto-optic disk medium.

That is, the second multiplying portion 194 multiplies the thermal shift interpolation function x2 and the thermal shift data Db, so that the magnitude [a(1g) shown in FIG. 28(B)] and direction of thermal shift of the cases of the longest and the shortest mark interval is obtained and output. This output data is designated as the interpolation thermal shift data Db1.

The thermal shift compensation amount computing portion 195 obtains the compensation amount $\Delta 1g$, by performing operations on the interpolation thermal shift data Db1 in accordance with the aforementioned equation (4). The compensation amount $\Delta 1g$ is designated as the thermal shift compensation signal Sb.

The timing of turning on the LD for outputting laser light is adjusted in accordance with the thermal shift compensation signal Sb so that the front edge shift may not occur. The constant shift upper and lower reference levels x3, x4 stored in the third memory portion 196 are provided for the purpose of determining whether or not the magnitude of edge shift due to constant shift is within the appropriate range.

Specifically, the comparison/determination portion 197 compares the magnitude of constant shift data Dc with the upper and lower reference levels x3, x4 so that it is determined whether or not the magnitude is within the range limited by the upper and lower reference levels x3, x4, and then outputs a emitted write power modification signal Sc in response to this determination result.

When it is determined that the magnitude of constant shift data Dc is larger than the upper reference level x3, the emitted write power modification signal Sc for reducing power of the mark recording laser light is output; and, when it is determined that the same magnitude is smaller than the lower reference level x4, the signal So for increasing laser write power is output.

In other words, laser write power is adjusted using the emitted write power modification signal sc so that constant shift may not occur.

Figure 34B:
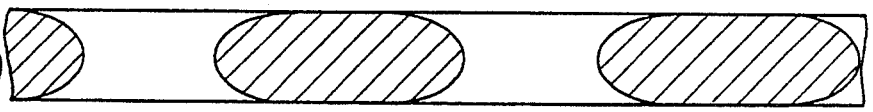
Figure 35:
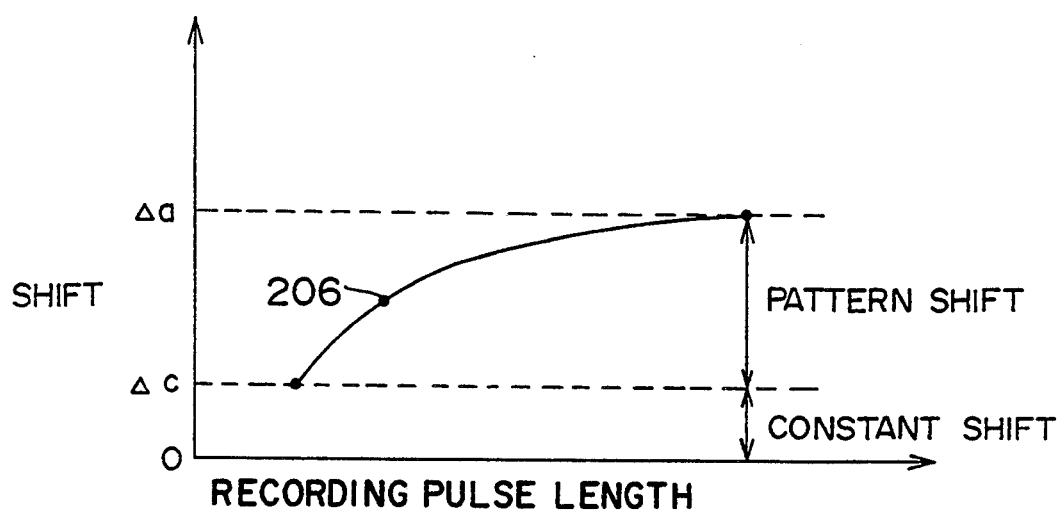
FIG. 35 shows another pattern shift interpolation.

FIGS. 34(A) and 34(B) illustrate other trial recording patterns; FIG. 35 describes another pattern shift interpolation; and FIG. 36 describes another thermal shift interpolation. For improvement of accuracy of interpolation, a pattern alternating between the mark length 2 $\tau$ and the mark interval 4 $\tau$ as shown in FIG. 34(A) as well as a pattern alternating between the mark length 4 $\tau$ and the mark interval 2 $\tau$ as shown in FIG. 34(B) may be employed in recording, in addition to the patterns shown in FIGS. 31(A)-31(C).

Figure 36:
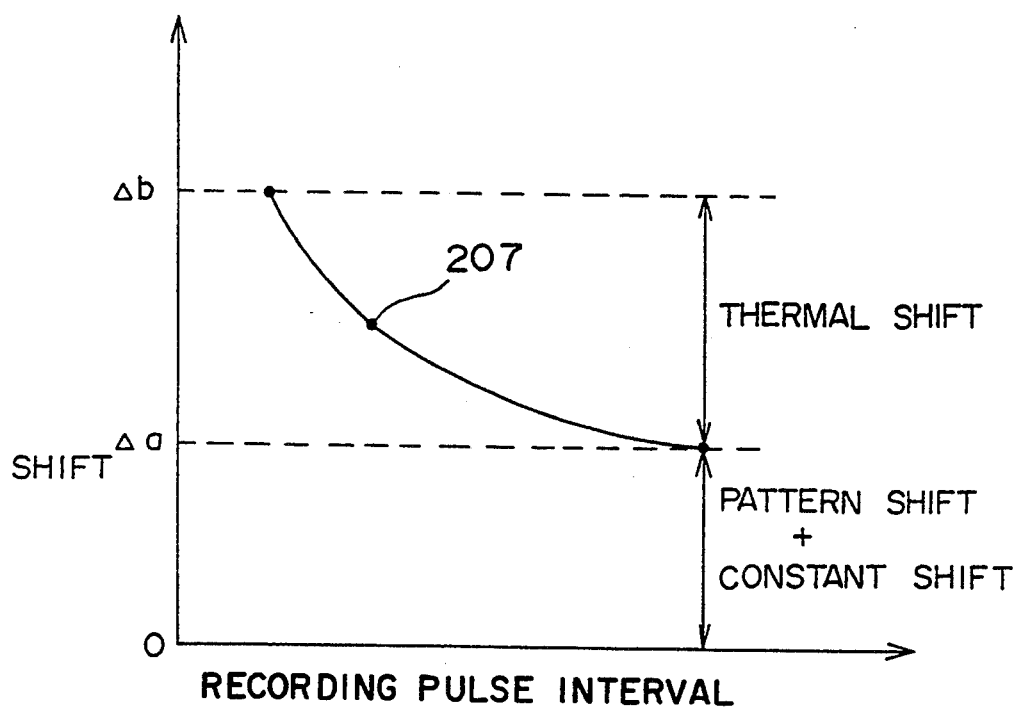
FIG. 36 shows another thermal shift interpolation.

As indicated by a numeral 206 in FIG. 36 and a numeral 207 in FIG. 36, it is desirable for more accurate interpolation that the amounts of edge shift due to pattern shift and thermal shift may be obtained for more points on the characteristic curve, so that the total number of data, to which the interpolation functions x1, x2 are fitted, may increase.

The above arrangement enables learning more accurate shift characteristic, thus making compensation compatible with the magneto-optic disk medium having not only different magnitude of pattern shift or thermal shift but also different appearance of shift characteristic.

As has been described, the third invention enables, on the basis of trials, determination of the recording compensation amount with respect to the characteristic of three kinds of edge shift, i.e., pattern shift, thermal shift and constant shift, when the marks are recorded on the magneto-optic disk according to the edge recording/reproducing method. Therefore, compatibility with the variation of edge shift characteristics from one magneto-optic disk to another as well as compatibility with a variety of mediums having different edge shift characteristics, are attainable, thus ensuring proper mark recording.

The present invention is not limited to the above described embodiments, and variations and modifications may be made without departing from the scope of the present invention.

What is claimed is:

1. An optical recording apparatus comprising:
    a rotating mechanism for rotating an optical medium on which information is recorded;
    an optical head having a light source for recording information on said optical medium by producing a light beam;
    a moving mechanism for moving said optical head to a predetermined position on said optical medium;
    recording controlling means for controlling the light source of said optical head in accordance with a recording pulse, said recording pulse having a pulse width and separated from another, preceding recording pulse by a pulse interval, said pulse width and said pulse interval changing in response to the information to be recorded on said optical medium, such that recording marks are formed on said optical medium during a high-level period of said recorded pulse, said recording controlling means comprising:
    pulse width measuring means for measuring the pulse width of said recording pulse;
    fall controlling means for effecting a recording compensation by advancing a fall of said recording pulse with a lead such that said lead increases with the measured pulse width;
    pulse interval measuring means for measuring a pulse interval preceding said recording pulse; and
    rinse controlling means for effecting a recording compensation by delaying a rise of said recording pulse with a delay such that said delay decreases with the measured pulse interval.

2. The optical recording apparatus as claimed in claim 1, wherein said optical recording medium carries said recording mark on a recording surface thereof in the form of heights and depressions.

3. The optical recording apparatus as claimed in claim 1, wherein said optical recording medium carries said recording mark on a recording surface thereof in the form of magnetic domains having a direction of magnetization.

4. The optical recording apparatus as claimed in claim 1, wherein said apparatus comprises:
    a first memory which is fed, at an address input thereof, with an output from said pulse width measuring means and outputs, to said fall controlling means, edge shift correction data corresponding to the measured pulse width; and
    a second memory which is fed, at an address input thereof, with an output from said pulse interval measuring means and outputs, to said rise controlling means, edge shift correction data corresponding to the measured pulse interval.

5. The optical recording apparatus as claimed in claim 4, wherein said fall controlling means is provided with:
    a first delay circuit outputting, in the basis of the data output from said first memory, a first delay pulse having a delay time that decreases with said measured pulse width; and
    a flip-flop which is fed with said first delay pulse at a set terminal thereof and outputs, from an output terminal, a corrected recorded pulse for modulating the light intensity of said light beam.

6. The optical recording apparatus as claimed in claim 4, wherein said fall controlling means is provided with:
    a second delay circuit outputting, in the basis of the data output from said second memory, a second delay pulse having a delay time such that said delay time increases with a decrease of said measured pulse interval;

a flip-flop being fed with said second delay pulse at a reset terminal thereof, and outputs from the output terminal, said corrected recorded pulse for modulating the light intensity of said light beam.

7. The optical recording apparatus as claimed in claim 5, said apparatus comprising modifying means for modifying a recording edge shift data stored in said first memory, in correspondence to at least one of the following factors: the record track number on said optical medium, medium sensitivity and ambient temperature.

8. The optical recording apparatus as claimed in claim 5, wherein said first delay circuit is embodied by a programmable delay which is fed with data output from said first memory at a data terminal thereof for producing a delay pulse having a time delay corresponding to the value of the data supplied to the data terminal.

9. The optical recording apparatus as claimed in claim 5, wherein said first delay circuit comprises:
a delay line of a multi-tap construction for applying a plurality of delay times to said recording pulse and outputting the results from a plurality of output terminals; and
a multiplexer for selecting, on the basis of the data output from said first memory, one of the pulses from a plurality of output terminals of said delay line, for outputting the selected pulse.

10. The optical recording apparatus as claimed in claim 6, said apparatus comprising modifying means for modifying a recording edge shift data stored in said second memory, in correspondence to at least one of the following factors: the record track number on said optical medium, medium sensitivity and ambient temperature.

11. The optical recording apparatus as claimed in claim 6, wherein said second delay circuit is embodied by said programmable delay which is fed with data output from said second memory at a data terminal thereof for producing a delay pulse having a time delay corresponding to the value of the data supplied to the data terminal.

12. The optical recording apparatus as claimed in claim 6, wherein said second delay circuit comprises:
a delay line of a multi-tap construction for applying a plurality of delay times to said recording pulse and outputting the results from a plurality of output terminals; and
a multiplexer for selecting, on the basis of the data output from said first memory, one of the pulses from a plurality of output terminals of said delay line, for outputting the selected pulse.

13. An optical recording apparatus comprising:
a rotating mechanism for rotating an optical medium on which information is recorded;
an optical head having a light source for recording information on said optical medium by producing a light beam;
a moving mechanism for moving the optical head to a predetermined position on the optical medium;
recording controlling means for controlling the light source of said optical head in accordance with a recording pulse, said recording pulse having a pulse width and separated from another, preceding recording pulse by a pulse interval, said pulse width and said pulse interval being changed in response to the information to be recorded on said optical medium, such that recording marks are formed on said optical medium during a high-level period of said recorded pulse, said recording controlling means comprising:
relative pulse width measuring means for subtracting, from the pulse width of a given recording pulse, the width of a pulse interval preceding said given recording pulse, to obtain a first relative difference;
fall controlling means for effecting a recording compensation by advancing a fall of said gives recording pulse by a lead such that said lead increases with said first relative difference;
relative pulse interval measuring means for subtracting, from the width of a pulse interval preceding a given recording pulse, the pulse width of a preceding recording pulse that precedes said pulse interval, to obtain a second relative difference; and
rise controlling means for effecting a recording compensation by delaying the rise of said given recording pulse by a delay such that said delay decreases with said second relative difference.

14. The optical recording apparatus as claimed in claim 13, wherein said optical recording medium carries said recording mark on a recording surface thereof in the form of heights and depressions.

15. The optical recording apparatus as claimed in claim 13, wherein said optical recording medium carries said recording mark on a recording surface thereof in the form of magnetic domains having a direction of magnetization.

16. An optical medium recording method for recording information, represented by recording pulses separated from each other by pulse intervals, on an optical recording medium comprising the steps of:
measuring the pulse width of a recording pulse for the information to be recorded on an optical medium;
advancing the fall of said recording pulse by a lead such that said lead increases with said measured pulse width;
measuring the duration of a pulse interval preceding a recording pulse;
delaying the rise of said recording pulse by a delay such that said delay decreases with said measured pulse interval; and
impinging light on said optical recording medium from an optical head having a light source, in correspondence to a high-level period of said recording pulse having its rise delayed and its fall advanced, and thus recording information by forming recording marks on said optical recording medium.

17. The optical recording method as claimed in claim 16, said method comprising the steps of:
supplying an address input of said measured pulse width to a memory device and outputting an edge shift correction data therefrom in correspondence to the measured pulse width; and
supplying an address input of said measured pulse interval to a memory device and outputting an edge shift correction data therefrom in correspondence to the measured pulse interval.

18. The optical medium recording method as claimed in claim 16, said method comprising the steps of:
effecting trial recordings in advance of the recording of said information, in such a manner that marks are recorded on said optical recording medium in correspondence to trial recording pulses;
reproducing said trial recording pulses from said optical recording medium to form a reproduced signal;

binarizing said reproduced signal to produce a binarized signal integrating said binarized signal for obtaining an integrated signal of said binarized signal;

detecting a pattern shift indicative of a shift of a rear edge of a recording mark on said optical recording medium caused as a result of accumulation of heat in said optical recording medium during the recording of said recording mark, a thermal shift indicative of a shift of a front edge of a recording mark on said optical recording medium caused as a result of accumulation of heat in said optical recording medium during the recording of a preceding recording mark, and a constant shift indicative of a shift of edges of a recording mark on said optical recording medium caused as an environmental temperature, on the basis of said integrated signal;

obtaining pattern shift data indicating the magnitude of an edge shift of a given recording pulse, by multiplying said pattern shift upon a predetermined pattern shift interpolation function; and obtaining, in the basis of said pattern shift data, a compensation amount for canceling said pattern shift, and outputting the obtained amount as a pattern shift compensation signal.

19. The optical recording method as claimed in claim 18, wherein said method further comprises the steps of:

obtaining thermal shift data indicating the magnitude of an edge shift of a given recording pulse, by multiplying said thermal shift upon a predetermined thermal shift interpolation function; and obtaining, on the basis of said thermal shift data, a compensation amount for canceling said thermal shift, and outputting the obtained amount as a thermal shift compensation signal.

20. An optical recording method for recording information, represented by recording pulses separated from each other by pulse intervals, on an optical recording medium, comprising the steps of:

measuring a pulse width difference by subtracting, from the pulse width of a given recording pulse, the duration of a pulse interval preceding said given recording pulse;

advancing the fall of said given recording pulse by a lead such that said lead increases with said pulse width difference;

measuring a pulse interval difference by subtracting, from the duration of a pulse interval that precedes a given recording pulse, the width of a recording pulse preceding said pulse interval;

delaying the rise of said given recording pulse by a delay such that said delay decreases with said pulse interval difference; and impinging light on said optical recording medium from an optical head having a light source, in correspondence to a high-level period of said recording pulse having its rise delayed and its fall advanced, and thus recording information by forming recording marks on said optical recording medium.

21. An optical recording apparatus for recording information on an optical recording medium, comprising:

a rotating mechanism for rotating an optical medium on which information is recorded;

an optical head having a light source for recording information on said optical medium by producing a light beam;

a moving mechanism for moving said optical head to a predetermined position on said optical medium;

recording controlling means for controlling the light source of said optical head in accordance with a recording pulse, said recording pulse having a pulse width and separated from another recording pulse by a pulse interval, said pulse width and said pulse interval changing in response to the information to be recorded on said optical medium, such that recording marks are formed on said optical medium during a high-level period of said recorded pulse, said recording controlling means comprising: fall controlling means supplied with data indicative of the pulse width of a recording pulse for effecting a recording compensation by advancing a fall edge of said recording pulse with a lead that increases with said pulse width; and rise controlling means pulled with data indicative of the duration of the pulse interval preceding a recording pulse for effecting a recording compensation by retarding a rise edge of said recording pulse with a delay that decreases with said duration;

trial recording means for effecting a trial recording of trial pulses on said optical recording medium in advance of the recording of said information, said trial recording means comprising binarizing means for reproducing said trial pulses from said optical recording medium and for producing binary output signals indicative of said trial pulses;

integrating means for integrating said binary output signals for producing an integrated signal; and shift evaluation means for evaluating a fall edge shift indicative of a shift of the falling edge of said trial pulses on said optical recording medium, and a rise edge shift indicative of a shift of the rising edge of said trial pulses on said optical recording medium, said shift evaluation means producing a first evaluation signal indicative of said fall edge shift of said trial pulses and a second evaluation signal indicative of said rise edge shift of said trial pulses;

wherein said recording control means further comprises:

first multiplying means for evaluating an interpolated fall edge shift indicating the relationship between the fall edge shift and the pulse weight of a recording pulse, by multiplying said first evaluation signal upon a predetermined interpolation function indicative of a relationship between the fall edge shift and the pulse width of a recording pulse on a standard recording medium; and second multiplying means for evaluating an interpolated fall edge shift indicating the relationship between the fall edge shift and the pulse weight of a recording pulse, by multiplying said second evaluation signal upon a predetermined interpolation function indicative of a relationship between the rise edge shift and the pulse interval of a recording pulse on a standard recording medium;

said fall controlling means and said rise controlling means conducting said recording compensation based upon said interpolated fall edge shift and said interpolated rise edge shift.

22. The optical recording apparatus as claimed in claim 21, wherein the patterns of said trial pulses, with which said trial recordings are effected, include a pattern alternating between the longest mark length and the longest mark interval, a pattern alternating between the longest mark length and the shortest mark interval, and a pattern alternating between the shortest mark length and the longest mark interval.

23. The optical recording apparatus as claimed in claim 22, wherein said apparatus further comprises comparison/determination means for detecting an edge shift based upon said trial pulse having the shortest mark length and the longest mark interval, said comparison/determination means comparing said detected edge shift with upper and lower predetermined reference levels, for outputting a control signal for reducing power of said light source when it is found that said edge shift is greater than said upper reference level, and outputting another control signal for increasing power of said light source when it is found that said edge shift is smaller than said lower reference level.

* * * * *